US010773469B2

(12) United States Patent
Hollander et al.

(10) Patent No.: US 10,773,469 B2
(45) Date of Patent: Sep. 15, 2020

(54) SYSTEMS AND METHODS OF CONVERTING FIBER INTO SHAPED FABRIC PLIES FOR COMPOSITE PREFORMS AND PRODUCTS

(71) Applicant: Seriforge, Inc., San Francisco, CA (US)

(72) Inventors: Jonathan Worthy Hollander, San Francisco, CA (US); Eric Gregory, Larkspur, CA (US); Marco Zvanik, Frisco, TX (US)

(73) Assignee: SERIFORGE INC., San Francisco, CA (US)

(*) Notice: Subject to any disclaimer, the term of this patent is extended or adjusted under 35 U.S.C. 154(b) by 378 days.

(21) Appl. No.: 15/900,566

(22) Filed: Feb. 20, 2018

(65) Prior Publication Data
US 2018/0236733 A1    Aug. 23, 2018

Related U.S. Application Data

(60) Provisional application No. 62/461,733, filed on Feb. 21, 2017.

(51) Int. Cl.
*B29C 70/00* (2006.01)
*D04H 3/00* (2012.01)
*B29C 70/22* (2006.01)
*B29C 70/38* (2006.01)
*D04H 3/12* (2006.01)
(Continued)

(52) U.S. Cl.
CPC ........... *B29C 70/228* (2013.01); *B29C 70/24* (2013.01); *B29C 70/382* (2013.01); *B29C 70/543* (2013.01); *B29C 70/545* (2013.01); *D04H 3/05* (2013.01); *D04H 3/12* (2013.01)

(58) Field of Classification Search
CPC ......... B29C 70/00; B29C 70/20; B29C 70/22; B29C 70/228; B29C 70/24; B29C 70/30; B29C 70/38; B29C 70/382; B29C 70/50; B29C 70/54; B29C 70/543; B29C 70/545; D04H 3/00; D04H 3/12
See application file for complete search history.

(56) References Cited

U.S. PATENT DOCUMENTS

| 9,539,766 B2* | 1/2017 | Gottinger | B29B 11/16 |
| 2013/0174969 A1* | 7/2013 | Karb | B29B 11/16 156/196 |
| 2014/0103571 A1* | 4/2014 | Karb | B29C 70/56 264/229 |

FOREIGN PATENT DOCUMENTS

WO    2014053305    4/2014

* cited by examiner

*Primary Examiner* — Jacob T Minskey
*Assistant Examiner* — Matthew Hoover
(74) *Attorney, Agent, or Firm* — Trellis IP Law Group, PC

(57) ABSTRACT

Various embodiments provide an apparatus, method, and/or system by which fiber, e.g., in the form of tow or tow, is used to create a shaped ply by facilitating drawing fiber from a supply along a fiber axis between two sets of pins; moving the pins across the fiber axis to form a fiber web in the desired ply shape; fixing the fiber web to form the shaped ply; and releasing the shaped ply. By enabling formation of shaped plies (including plies with doubly curved surfaces and simultaneous sequences of strategically shaped plies) directly from a single piece of fiber tow, various embodiments discussed herein enable substantial reductions in labor and materials costs that are conventionally associated with construction of composite preforms and accompanying composite products.

26 Claims, 19 Drawing Sheets

(51) Int. Cl.
*D04H 3/05* (2006.01)
*B29C 70/54* (2006.01)
*B29C 70/24* (2006.01)

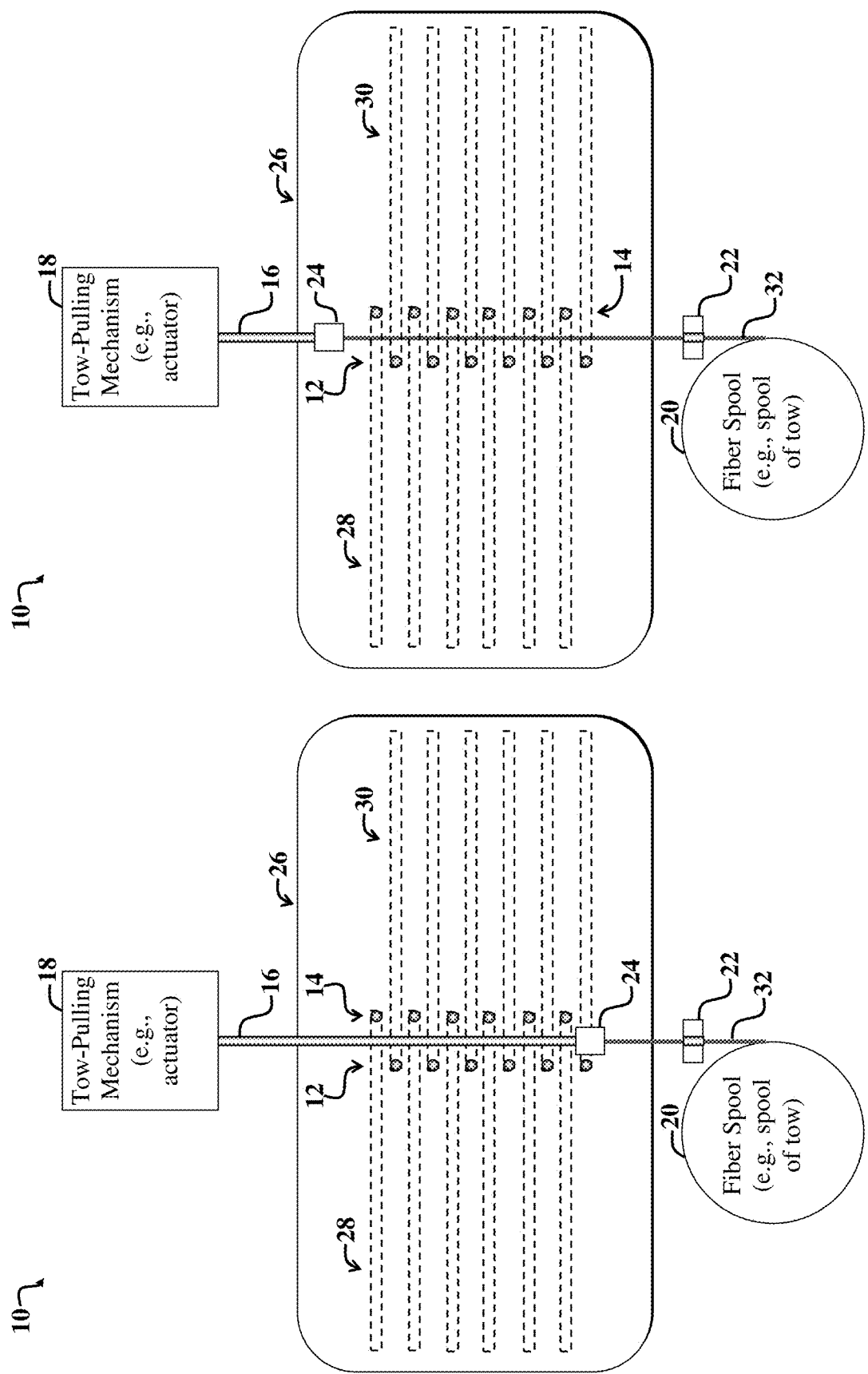

SYSTEMS AND METHODS OF CONVERTING FIBER INTO SHAPED FABRIC PLIES FOR COMPOSITE PREFORMS AND PRODUCTS

CROSS REFERENCE TO RELATED APPLICATIONS

This application claims priority from U.S. Provisional Patent Application Ser. No. 62/461,733, entitled SYSTEMS AND METHODS OF CONVERTING FIBER INTO SHAPED FABRIC PLIES FOR COMPOSITE PREFORMS AND PRODUCTS, filed on Feb. 21, 2017, which is hereby incorporated by reference as if set forth in full in this application for all purposes.

BACKGROUND

The present application relates to manufacturing, and more specifically to apparatuses and methods for arranging fibers in particular shapes for use in creating composite preforms and products.

Fiber-reinforced composite materials, referred to herein as composites, are materials comprised of fibers embedded in a matrix material. Typical fibers include but are not limited to glass fibers, carbon fibers (e.g. graphite fibers and/or more exotic forms of carbon, such as carbon nanotubes), ceramic fibers, and synthetic polymer fibers, such as aramid and ultra-high-molecular-weight polyethylene fibers. Typical matrix materials include but are not limited to thermoset resins, such as epoxies, vinylesters, and polyurethanes and thermoplastic resins, such as polyamides and PEEK (PolyEther Ether Ketone), as well as other non-plastic materials such as metals and ceramics.

Composite materials often combine high-strength and relatively light weight. In typical composite products, the fibers provide high tensile strength in one or more directions and the matrix material hold the fibers in a specific shape. A set of fibers roughly in the shape of a final product is referred to as a preform. Preforms are comprised of layers of woven or non-woven fabrics, each of which is cut and arranged into a desired shape. Each cut fabric piece is referred to as a ply. Multiple plies of varying shapes and fabric types are often stacked in different orientations to provide strength and stiffness optimized for the intended usage of the final product.

Plies may be assembled into a preform, which is a fabric shape approximating the shape of the desired part. The preform may be fabricated outside of the mold or other rigid structure, and then placed as a unit within the mold or other rigid structure for molding. Alternatively, individual plies may be assembled inside or on a mold, mandrel, plug, or other rigid structure in the shape of the desired finished part. The process of assembling a preform or placing plies within a mold is referred to as layup.

Following the layup of a preform and/or plies, the plies may be solidified into a rigid part by adding and/or activating a matrix material. A matrix material, such as uncured polymer resin, may be embedded in the fabric prior to cutting plies (referred to as a pre-impregnated or prepreg material) or applied to or infused into the fabric during or after the fabric layup process, using processes including but not limited to such as wet layup, wet compression molding, or vacuum and/or pressure assisted resin transfer molding. The matrix material is then cured or hardened, often under elevated temperature and/or pressure differentials to ensure even distribution of the matrix material and prevent voids, air bubbles, or other internal defects. Pressure, heat, and/or electromagnetic energy, such as ultraviolet light or microwave energy, may be applied to the composite part during curing using techniques including but not limited to compression molding, vacuum bags, autoclaves, inflatable bladders, and/or curing ovens.

However, use of conventional fiber cloth and associated cloth-forming and preform-construction techniques can be particularly expensive due to waste and processing steps. Weaving or binding fibers into fabric adds substantial costs on top of the fiber costs. After cutting, there are often substantial amounts of scrap fabric that are too small and/or irregularly shaped to be useful. This waste cost is exacerbated if the fabric includes pre-impregnated matrix material. Furthermore, the optimal arrangement or nesting of plies for cutting is often different than the arrangement or order required for layup; therefore, additional labor or automation costs are required to collate cut plies into the correct layup quantities and order, referred to as kitting.

Additionally, it is often difficult to conform flat fabrics to curved shapes due to the stiffness, inelasticity, and resistance to shearing of the fabric material. Additionally, it is difficult to conform fabric to some types of non-planar (e.g. curved) shapes due to characteristics of the shape itself, such as regions of non-zero Gaussian curvature. These difficulties conforming fabric can lead to additional layup costs and material waste.

SUMMARY

An example embodiment discloses an apparatus and associated system for creating a ply representing a layer of fibers arranged in a predetermined shape. The example apparatus includes a first mechanism for defining a shape of a ply to be created. A second mechanism employs pins to selectively pull a fiber tow (also simply called a tow herein) into the shape by moving the pins into positions defined by an outline of the shape as determined by the first mechanism. A third mechanism facilitates binding adjacent paths of the fiber tow (which form a web) that extend across or over the shape, thereby resulting in a first ply of the predetermined shape.

In a more specific embodiment, the apparatus further illustrates a fourth mechanism for releasing the ply from contact with the pins. The fourth mechanism further includes a mechanism for cutting the fiber tow loose from each pin using a blade. The blade may be a separate blade coupled to each pin. Alternatively, or in addition, the blade includes a flexible blade arranged to conform to a path as defined by the positions of the pins defined by an outline of the shape. The shape may be a three-dimensional shape, e.g., a shape exhibiting a doubly curved surface (also called a non-zero Gaussian surface herein).

Another embodiment uses a template for defining the shape. The template includes edges (e.g., edges of an interior cutout of the template, or on the outside of a platen, when the platen is used as a template) that restrain or otherwise fix positions of the pins on opposite sides of the template, such that the fiber tow drapes over (or under) the template.

The template may include a three-dimensional template, e.g., when the predetermined shape includes a three-dimensional shape. In certain implementations, the three-dimensional template is used as a heatable platen (e.g., equipped with resistive heating elements), that is readily usable to activate thermally sensitive binder material included in the tow, so as to implement the third mechanism.

An additional mechanism may enable selective rotation of the three-dimensional template (which may also act as a platen), from a first orientation to a second orientation, to facilitate creating a second ply of the predetermined shape. The paths of the tow of the second ply are angled differently from paths of the tow of the first ply, depending upon the angle by which the three-dimensional template has been rotated when transitioning to the second orientation.

In an illustrative embodiment, shape includes plural sub-shapes that comprise shapes of a kit for a preform. The associated template may exhibit plural shapes (e.g., defined by cutouts), wherein the template and associated plural shapes define the terminal positions of the pins. The template may include and/or be used with a platen that facilitates both defining the plural shapes and binding or fixing the fiber tow, e.g., via application of heat. The binder material may include meltable or heat-curable fibers or filaments, e.g., polyester, nylon, etc. Alternatively, or in addition, the fiber tow includes pre-impregnated fiber tow, which has been pre-treated with a binder material that can be thermally activated. Alternatively, another type of binder, e.g., spray glue, may simply be sprayed over the fiber web to facilitate forming the shaped ply from the web.

Various embodiments further show use of a mechanism for drawing fiber from a supply of fiber along a fiber axis between two opposing sets of pins; and a mechanism for moving the opposing pins across an initial center fiber axis to form the fiber web in the predetermined shape. Accordingly, an accompanying example method includes drawing fiber tow from a supply along a fiber axis between two offset opposing sets of pins; moving the pins across the fiber axis to form a fiber web in the desired ply shape; fixing the fiber web to form a shaped ply; and releasing the shaped ply.

Hence, various embodiments discussed herein afford substantial benefits over conventional systems and methods for creating fiber plies for use in construction of composite products and/or associated preforms. By enabling rapid generation of multi-dimensional plies using a single tow by selectively moving pins to create a web that is deformable around surfaces, embodiments discussed herein can not only substantially reduce waste (e.g., from scrap material), but can minimize time consuming and error-prone labor that is conventionally required to create plies for use in constructing composite preforms and associated structures. In addition, embodiments discussed herein may substantially eliminate labor and materials costs required to obtain conventional woven fiber fabric.

Furthermore, the movable pins of various embodiments discussed herein facilitate creating multiple different shapes simultaneously, thereby obviating a conventionally tedious kitting process that otherwise may involve cutting different shapes of material from expensive fabric; collating the different pieces into a bin; sorting the pieces, and so on, in preparation for layup and creation of composite preforms and associated composite products.

In summary, various embodiments enable conversion of fiber directly into shaped plies, thereby bypassing expensive fabric formation and conventional wasteful pile-formation steps. Plies with interior cutouts; plies with flat and/or doubly curved surfaces; sequences of strategically shaped plies; and so on, can all be efficiently and rapidly generated using embodiments discussed herein.

Furthermore, various embodiments discussed herein are readily adaptable for use with various linear actuators and/or other programmable electromechanical systems, thereby providing additional substantial flexibility and versatility for fabricating arbitrary ply shapes and arbitrary sequences of plies.

A further understanding of the nature and the advantages of particular embodiments disclosed herein may be realized by reference of the remaining portions of the specification and the attached drawings.

BRIEF DESCRIPTION OF THE DRAWINGS

FIG. 1A illustrates a first example apparatus for creating a web of fabric in a predetermined shape via selective movement of pins across a fiber axis, and for facilitating binding the resulting web of fabric into a shaped ply.

FIG. 1B illustrates the first example apparatus of FIG. 1A after fiber tow is pulled from a spool of fiber tow along a fiber axis between offset opposing sets of tow guide pins via a pulling mechanism that is coupled to an arm equipped with a tow-gripping mechanism.

DETAILED DESCRIPTION OF EMBODIMENTS

Figure 1C:
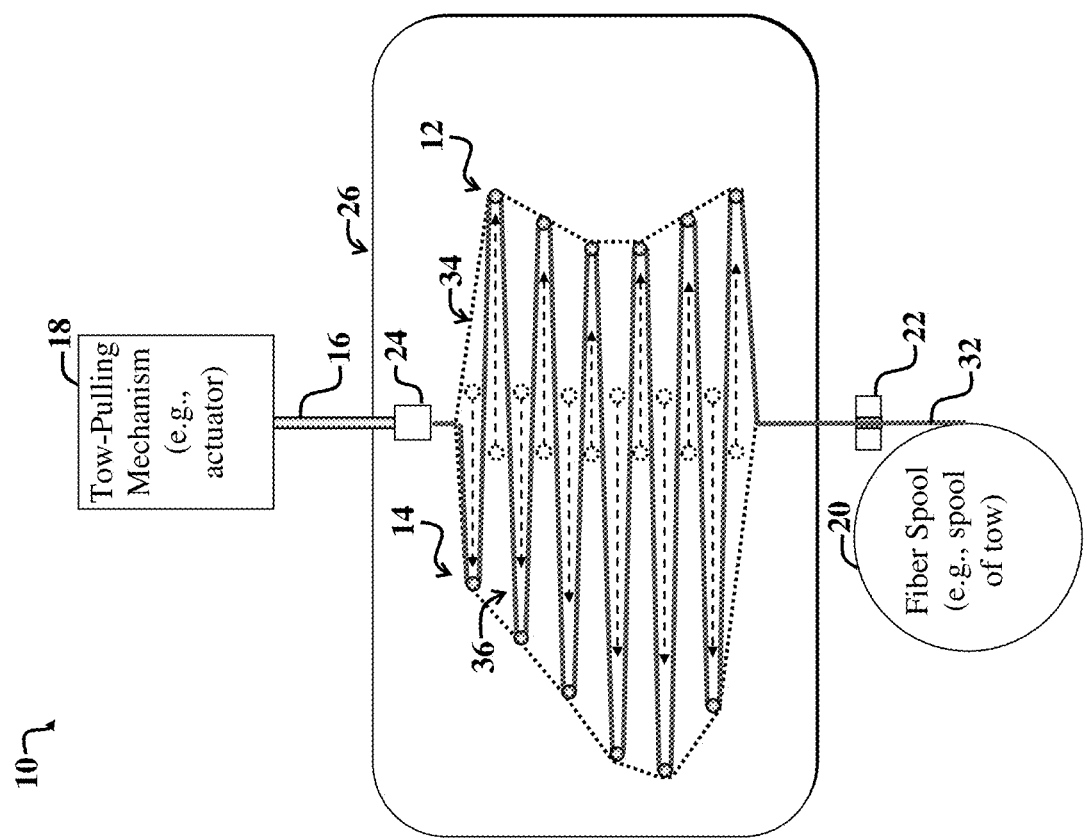
FIG. 1C illustrates the first example apparatus of FIG. 1B after the opposing sets of pins are actuated into the predetermined shape corresponding to the shape of a ply to be formed by binding the fibers of the web created between the opposing sets of pins.

Methods and devices for manufacturing fiber preforms and finished 3D composite products and fabric plies used to construct these preforms and products. For the purposes of the present discussion, a composite material may be any material that includes one or more fibers that are embedded in a matrix material. An example of a composite material is carbon fiber reinforced polymer.

For clarity, certain well-known components, such as hard drives, processors, operating systems, power supplies, actuators, stacks of templates or platens, pick-and-place robots, user interface display screens, control software for automated implementations of embodiments, and so on, are not necessarily explicitly called out in the figures. However, those skilled in the art with access to the present teachings will know which components to implement and how to implement them to meet the needs of a given implementation.

FIG. 1A illustrates a first example apparatus 10, i.e., system, for creating a web of fabric in a predetermined shape via selective movement of pins 12, 14 across a fiber axis (coinciding with or inline with an initial path of a tow 32), and for facilitating binding the resulting web of fabric into a shaped ply.

The example system 10 includes a fiber tow (also simply called tow herein) pulling mechanism 18, e.g., an actuator, coupled to an arm 16 that includes a tow-gripping mechanism 24 and accompanying gripping surface for gripping tow 32 that originates from a fiber spool 20. The spool 20 may be accompanied by a tensioner 22 to facilitate adjusting the initial tension of the tow 32 as it is being pulled by the tow-pulling mechanism 18.

The exact initial tension on the tow 32 is implementation specific and may vary. Those skilled in the art with access to the present teachings may readily adjust the tension of the tow 32 to meet the needs of a given application, without undue experimentation.

The tow 32 is pulled by the tow-pulling mechanism 18 and accompanying arm 16 and tow-gripping mechanism 24 along the initial fiber axis that extends between opposing and offset (i.e., offset relative to each other in FIG. 1A) sets of pins 12, 14. In the present example embodiment, the sets of pins 12, 14 are positioned in a pin plate 26 and are movable along respective pin slots 30, 28.

FIG. 1B illustrates the first example apparatus 10 of FIG. 1A after fiber tow 32 is pulled from the spool of fiber tow 20 along a fiber axis between offset opposing sets of tow guide pins 12, 14 via the tow-pulling mechanism 18 that is coupled to the arm 16, which is equipped with the tow-gripping mechanism 24. In FIG. 1B, the tow 32 has been pulled past a topmost pin of the sets of pins 12, 14, such that the tow 32 fully extends between opposing sets of pins 12, 14 along the initial fiber axis, which is coincident with the path of the tow 32 shown in FIGS. 1A and 1B.

FIG. 1C illustrates the first example apparatus of FIG. 1B after the opposing sets of pins 12, 14 are actuated into the predetermined shape 34 corresponding to the shape of a ply to be formed by binding the fibers of a fiber web 36 created between the opposing sets of pins 12, 14.

As shown in FIG. 1C, the sets of pins 12, 14 have passed each other across the initial fiber axis, as allowed, in part, by the pin offsets relative to adjacent pins of each pin. Accordingly, note that the first set of pins 12, which were initially to the left of the initial fiber axis (as shown in FIGS. 1A and 1B) are now on the right of the initial fiber axis. Similarly, the second set of pins 14 are now positioned to the left of the initial fiber axis.

In summary, FIGS. 1A-1C illustrate an example general embodiment and its basic operation and associated concepts, which are usable by various embodiments discussed herein and more fully below. In FIG. 1A, a fiber supply, e.g., the fiber spool 20, provides one or more fibers, e.g., in the form of tow, which is used to form plies.

The fiber may include carbon fiber, glass fiber, aramid fiber, or any other type of fiber suitable for use in composite materials. The use of the term tow herein in used to refer to fibers generally in tow, yarn, tape, thread, cord, or other fibrous or filamentary form. The arm 16 or other actuated mechanism attaches itself (or is otherwise manually attached) at or near the end of the fiber via the fiber gripping mechanism 24. The arm 16 is positioned between the two sets of pins 12, 14.

In FIGS. 1A and 1B, the first set of pins 12 is located on the left side of the arm 16, and the second set of pins 14 is located on the right side of the arm 16. The pins 12, 14 may be simple cylindrical pins or, as described in further embodiments below, include mechanical features for interfacing with and manipulating fiber, e.g., corresponding to the tow 32.

In FIGS. 1A and 1B, the arm 16 or other mechanism pulls additional fiber from the fiber supply 20, so that the fiber runs along an initial axis up to or past the length of the rows of pins 12, 14. The initial path of the fiber is called the fiber axis. In an embodiment, a tensioning system, e.g., which may be incorporated into the fiber spool 12, holds the fiber taut while it is being pulled by the tow-pulling mechanism 18.

In FIG. 1C, the some or all of pins 12, 14 move from their initial positions to opposite sides of the fiber axis and engage with the taut fiber 32. Because the pins 12, 14 are staggered in position, they are free to pass by the adjacent pins in the other pin set. The pins 12, 14 then move further past the fiber axis to positions defining a pair of edges (e.g., the left and right edges of the shape 34 of FIG. 1C) of the desired ply shape 34. As the pins move, they engage the fiber 32, and additional fiber is released from the fiber supply 20 to form a fiber web 36 in the desired ply shape 34. The pins 12, 14 may move simultaneously or alternatively sequentially, for example alternating between single pins in sets 12 and 14. In the latter embodiment, each pin may move from its initial position, across the fiber axis, and to its terminal position defining a row of the desired ply shape 34 before the next pin in the sequence moves.

As discussed in detail below, this fiber web 36 is then fixed into position, for example by bonding each course of the fiber 32 of the fiber web 36 with its adjacent courses and/or a layer of binding material, and then releasing the resulting ply from the pins 12, 14.

The resulting fixed fiber web 36 then represents a shaped ply suitable for use in constructing a composite preform or product. Because this shaped ply is formed directly from the fiber web 36, there is no need for intermediate processing of the fiber into a fabric and no waste from cutting the plies from the fabric.

Following the fixation and release of the fiber web 36 (which has been converted into a ply by bonding adjacent fibers), the pins 12, 14 then return to their starting positions on opposite sides of the fiber axis, and the system 10 is ready to form another ply with same or a different shape.

The sets of pins 12, 14 may be moved from their starting positions, across the fiber axis, and to positions defining edges of the ply shape. In one embodiment, each of the pins 12, 14 is driven independently using a linear actuator. Software control of these actuators facilitates moving the pins into arbitrary edge shapes, thereby defining plies with varying shapes. Furthermore, selective pin movement enables arbitrary sequences of plies to be constructed, which eliminates the need for collating cut plies into sets required for a complete part or preform, referred to as kitting.

In another embodiment, each of the two sets of pins 12, 14 is electromagnetically or mechanically coupled with a rail that may selectively move the pins in respective slots 30, 28. Each rail may be driven by a linear actuator (responsive to control signals) to move the associated pins 12, 14 from their initial positions, across the fiber axis, to any position up to end positions at the maximum extent of the pin range of motion.

When the pins 12, 14 are stopped at predetermined positions along the respective slots 30, 28, e.g., so as to define the ply shape 12, 14, the resultant pin positions are called terminal positions herein. Note that, as the term is used herein, terminal positions do not mean that the pins must stay in those positions, but rather merely suggest that the pins are at their positions needed to define a desired shape for a ply to be created from the accompanying fiber web formed between the pins 12, 14.

As each rail moves towards its terminal position, pins 12, 14 are selectively electromagnetically or mechanically decoupled from the rail to define the ply edge. After fixing and releasing the shaped ply, the rails reverse direction and then electromagnetically or mechanically re-couple with the pins to return them to their initial positions.

Note that embodiments of the invention using linear actuators or other programmable electromechanical systems provide substantial flexibility in fabricating arbitrary ply shapes and arbitrary sequences of plies. However, mass production applications often only require a limited number of ply shapes that are repeated in large quantities. For these applications, embodiments of the invention may use mechanical templates to define ply shapes. Furthermore, in certain implementations, the different sets of pins 12, 14 may be manually positioned, e.g., using mechanically tooling.

Figure 2A:
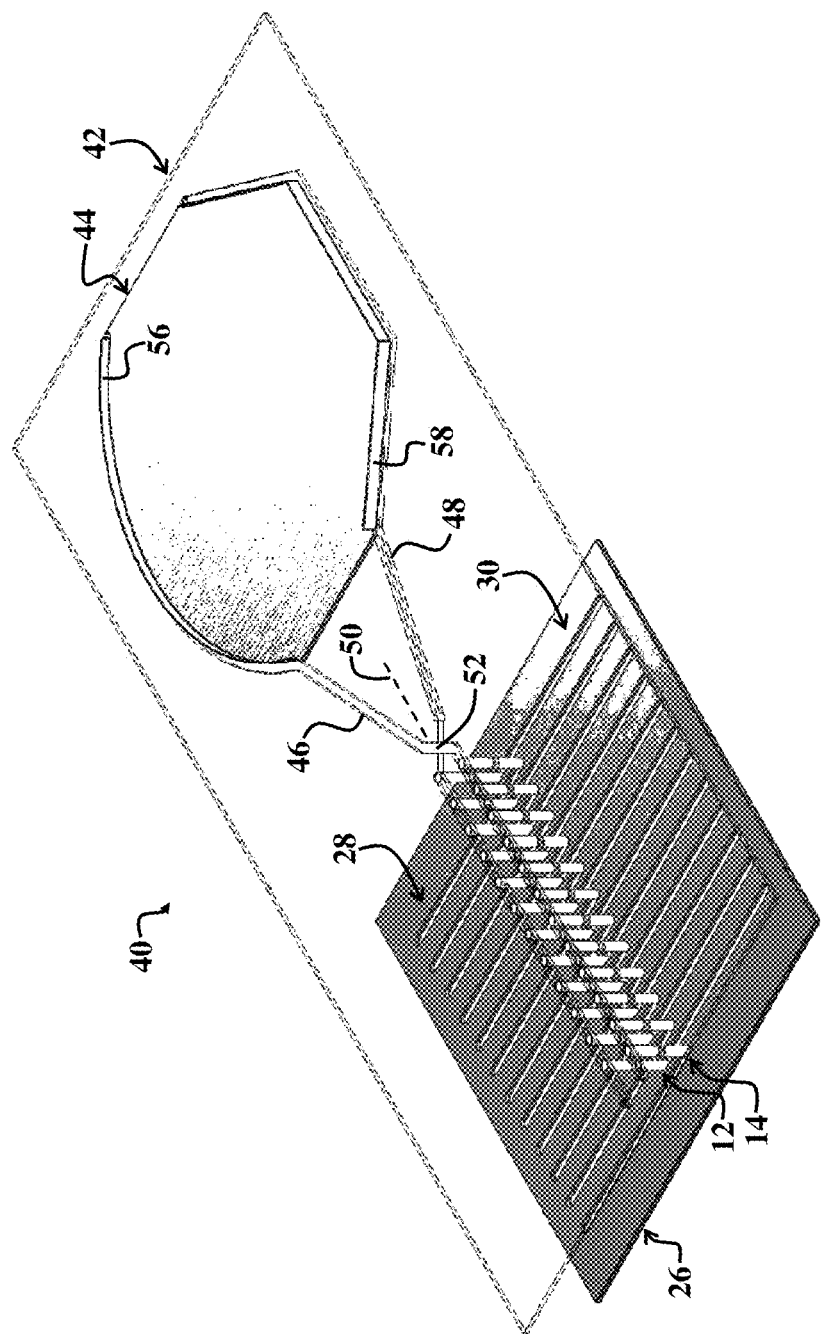
FIG. 2A illustrates a second example apparatus for selectively creating a shaped ply using a pin plate and a cam plate with pin-guide channels to create a shaped ply, wherein the shape of the ply is determined by terminal positions of the pins.

FIG. 2A illustrates a second example apparatus 40 for selectively creating a shaped ply using a pin plate 26 and a cam plate 42 with pin-guide channels 46, 48 to create a shaped ply defined by terminal positions of the opposing pins 12, 14. In FIG. 2A, the pins 12, 14 are at their initial positions in (respective slots 30, 28 of the pin plate 26) on either side of a fiber axis 50. The pin plate 26 is positioned below the cam plate 42 and may slide parallel to the cam plate and fiber axis 50.

Top portions of the pins 12, 14 ride in respective guide channels 48, 46 of the cam plate 42. The cam plate 42 includes a platen 44 in the desired shape of a ply. The pin guides 46, 48 conform to edges of the shaped platen 44.

As the pin plate 26 is moved along the fiber axis 50 toward the platen, the pins 12, 14 are guided by the respective guide channels 48, 46 which cross at a flap junction 52. Note that while details of the flap junction 52 are not explicitly shown in FIG. 2A, those skilled in the art with access to the present teachings will know how to readily implement such a junction to meet the needs of a given implementation, without undue experimentation.

As the pins 12, 14 travel along their respective guides 48, 46, they cross the fiber axis 50 as they cross the flap junction 52 and eventually reach their terminal positions at opposing sides of the shaped region corresponding to the shaped platen 44, as discussed more fully below. Note that while the associated tow and accompanying spool and tow-pulling mechanisms are not shown in FIG. 1C, the initial position of the tow would extend along the fiber axis 50 across the length of the cam plate 42.

The platen 44 is used, in part, to press down on an underlying fiber web formed between the pins 12, 14 when the pins reach the terminal positions, as discussed more fully below. This also helps to further flatten and align adjacent fibers of the web, reducing or eliminating any gaps therebetween in preparation for bonding.

The inter portions of the pin guides 46, 48 are equipped with respective movable blades 56, 48 that conform to a path defined by the inner surfaces of the pin guides 46, 48, and outer edges of the platen 44. The blades are used to release the underlying ply formed by a fiber web formed therebetween, after the web has been bonded, e.g., using heat applied to the platen 44. Note that the platen 44 may include resistive heating elements to facilitate activating thermally sensitive binder that is included in, with, among, or otherwise deposited on fibers of an underlying web that will be formed once the pins 12, 14 (with accompanying tow that snakes therebetween) reach their terminal positions at portions of the pin guides 48, 46 that are adjacent to sides of the platen 44 and accompanying curved (or otherwise appropriately shaped) blades 58, 56. The platen 44 may include binder-dispenser nozzles and act as a dispenser for binder material, wherein the dispenser is adapted to apply binder material to at least one surface of the fibers after the fiber tow has been pulled into the desired shape of the ply to be created via the web of fiber tow.

Figure 2B:
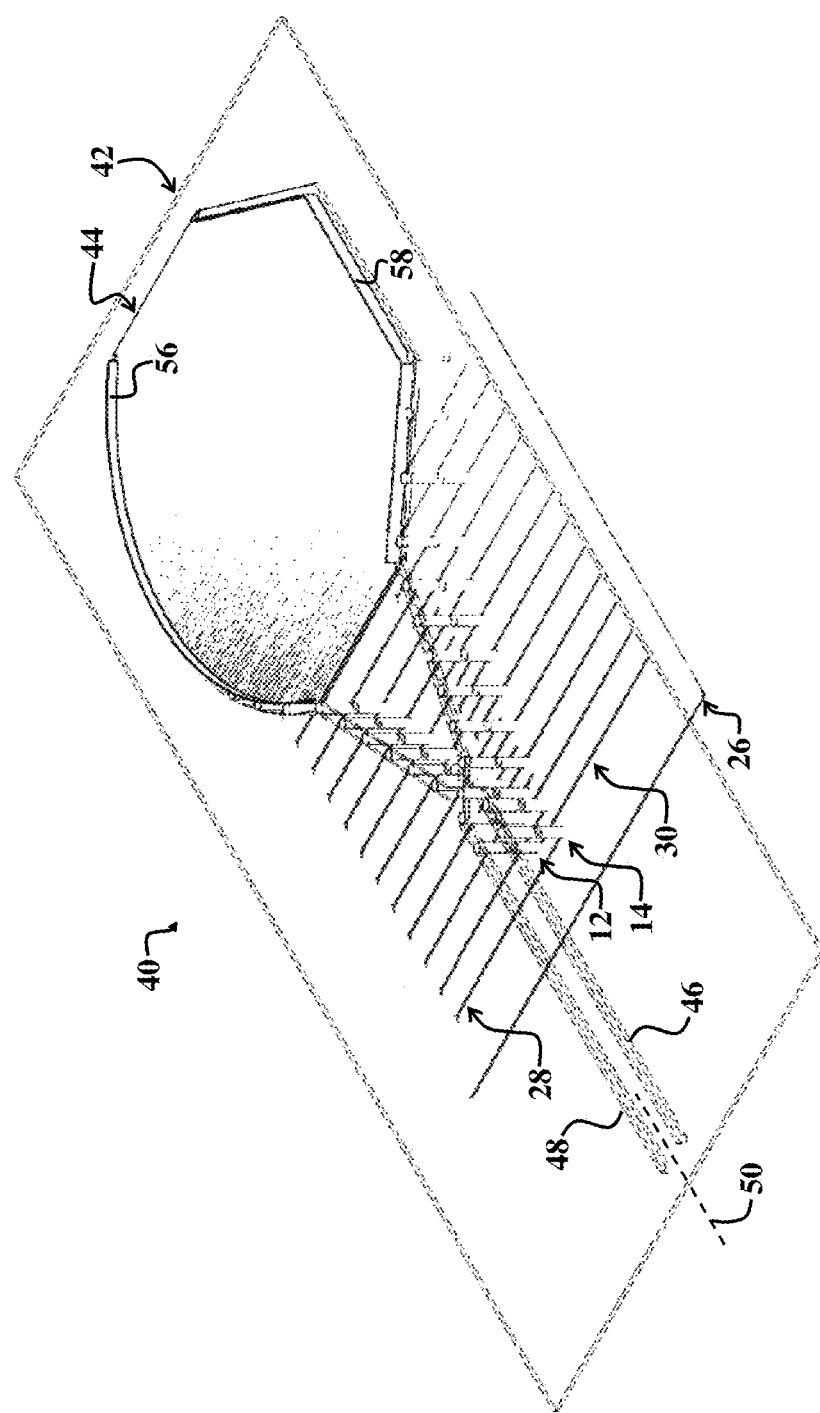
FIG. 2B illustrates the second example apparatus of FIG. 2A after the pin plate has been partially moved relative to the cam plate, thereby causing pins in the pin plate to move along the pin-guide channels of the cam plate.

FIG. 2B illustrates the second example apparatus 40 of FIG. 2A after the pin plate 26 has been partially moved relative to the cam plate 42 along the fiber axis 50, thereby causing pins 12, 14 in the pin plate 26 to move along the respective pin-guide channels 48, 46 of the cam plate 42.

Figure 2C:
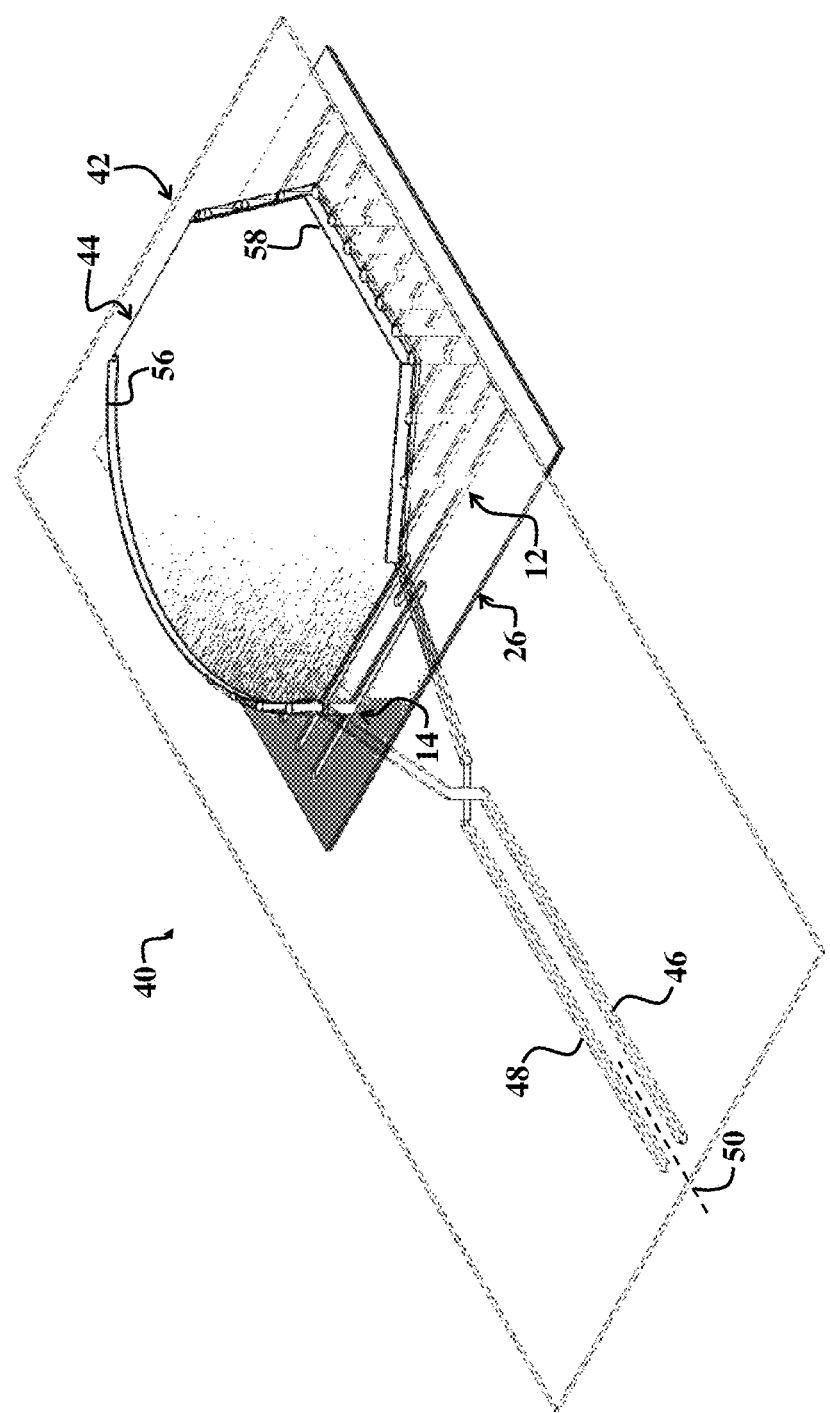
FIG. 2C illustrates the second example apparatus of FIG. 2B after the pin plate has been fully moved relative to the cam plate, thereby causing pins in the pin plate to be positioned along an outline defining a predetermined ply shape.

FIG. 2C illustrates the second example apparatus 40 of FIG. 2B after the pin plate 26 has been fully moved relative to the cam plate 42, thereby causing pins 12, 14 in the pin plate 26 to be positioned along an outline defining a predetermined ply shape, which corresponds to opposing edges of the platen 44.

At this stage, when the apparatus has been fitted with tow, a fiber web will have formed under the platen 44 as the tow snakes between offset and opposing pins 12, 14. In FIG. 2C, the platen 44 has yet to be depressed onto the underlying fiber web (not shown in FIG. 2C), and the ply-releasing blades 56, 58 have yet to be actuated.

Figure 2D:
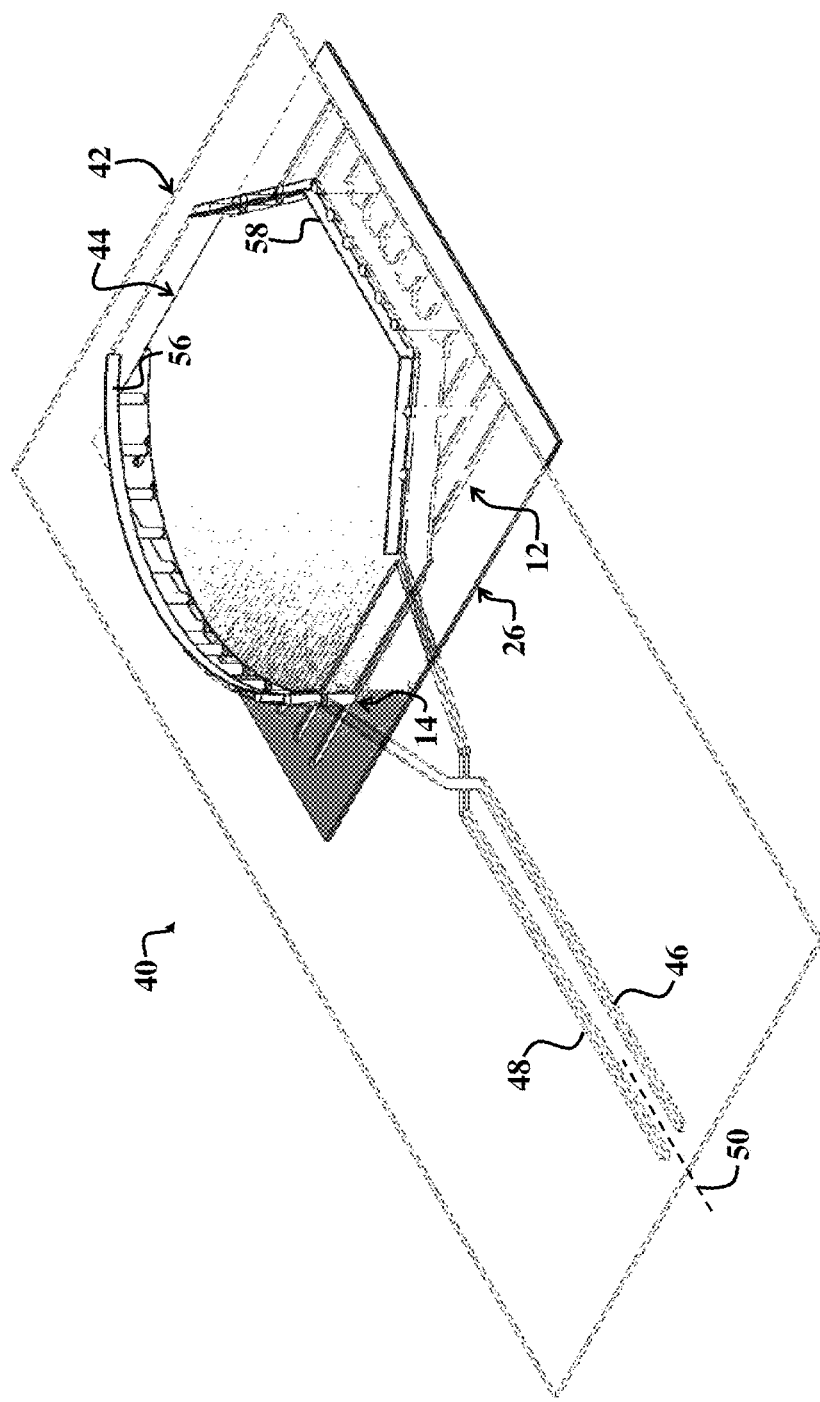
FIG. 2D illustrates the second example apparatus of FIG. 2C after a shaped platen of the cam plate has been pressed against an underlying fiber web formed between the opposing pins, wherein a shape of the underlying surface of the platen defines the shape of a ply to be formed by the second example apparatus.

FIG. 2D illustrates the second example apparatus 40 of FIG. 2C after a shaped platen 44 of the cam plate 42 has been pressed against an underlying fiber web (not shown in FIG. 2D) formed between the opposing pins 12, 14. A shape of the underlying surface of the platen defines the shape of a ply to be formed by the second example apparatus 40. Note that the bottom surface of the platen 44 may be flat or have a three-dimensional (e.g. curved) shape, such that the resulting ply (to be formed after bonding of the fibers of the underlying fiber web) will be a so-called three-dimensional ply. In this case of a non-planar platen 44, the apparatus 40 may include a secondary platen or a surface of cam plate 42 mating with the non-planar surface of the platen 44.

At this stage, the curved or otherwise shaped blades 56, 58 have yet to be actuated. The platen 44 may be heated, thereby bonding underlying fibers of an underlying fiber web. Note that mechanisms and accompanying methods, other than applying heat, may be used to bind underlying fibers of the fiber web to thereby form a shaped ply from the fiber web. Once the fibers have been bonded into a ply, the curved or shaped blades 56, 58 are actuated to cut loose the underlying ply from the apparatus 40.

Figure 2E:
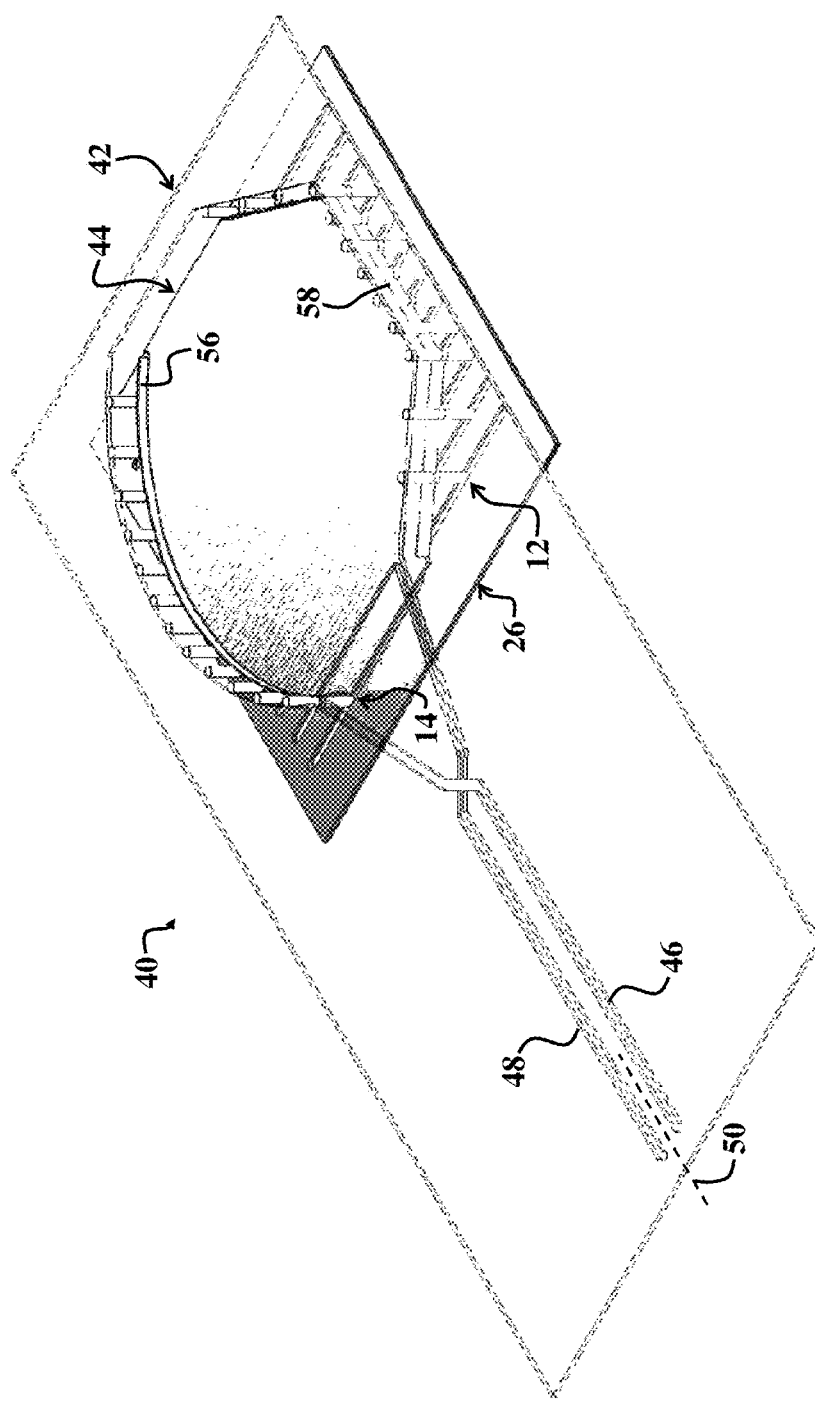
FIG. 2E illustrates the second example apparatus of FIG. 2D after curved blades, which are aligned with a path defined by the positions of the opposing pins, are used to cut the underlying shaped ply, thereby facilitating releasing the resulting shaped ply from the second example apparatus.

FIG. 2E illustrates the second example apparatus 40 of FIG. 2D after the curved or otherwise shaped blades 56, 58, which are aligned with a path defined by the positions of the opposing pins 14, 12, are used to cut the underlying shaped ply (in the shape of the platen 44), thereby facilitating releasing the resulting shaped ply from the second example apparatus 40.

Note that the shape of the example platen 44 is merely illustrative and may vary. Different shapes and/or multiple shapes of platens may be used individually and/or arranged serially along the fiber axis 50 and used simultaneously to cut multiple shapes. Furthermore, note that the exact size of the pin plate 26; the number of pins in the pin plate 26; the types of pins used; the spacing between pins along the fiber axis 50 direction; angling of the pins relative to the surface of the pin plate 26, and so on, are implementation specific and may be varied to meet the needs of a given implementation of the second example embodiment 40.

In summary, FIGS. 2A-2E illustrate a mechanical system for fabricating shaped plies. The fiber supply (e.g., the fiber spool 20 of FIGS. 1A-1C), fiber tow, tow-pulling mechanisms, arms, tow grippers (e.g., items 16-24 of FIGS. 1A-1C), and so on are omitted from FIGS. 2A-2E for clarity.

FIG. 2A shows the system 40 in an initial configuration. The sets of pins 12, 14 are installed in the pin plate 26, which includes horizontal guide channels 28, 30 defining the range of pin motion. The pins 12, 14 are also installed in a pair of vertical guide channels 46, 48 in the cam plate 42. In an embodiment, the pin plate 26 is below the pins 12, 14, and the cam plate 42 is above the pins 12, 14.

To actuate the pins 12, 14 and form a shaped ply, one or more fibers (e.g., fiber tow) are first pulled from the fiber supply (e.g., the spool 20 of FIGS. 1A-1C) along the fiber axis 50 between the pins 12, 14, as described above. Next, as shown in FIG. 2B, the pin plate 26 moves relative to the cam plate 42, so that the guide grooves 46, 48 in the cam plate 42 gradually move the pins 12, 14 across the fiber axis 50 to engage the fiber and then further away (from the fiber axis 50) to form the edges of the desired shape ply (wherein the edges are approximately coincident with the blades 56, 58), as shown in FIG. 2C. A gate mechanism (e.g., labeled 52 in FIG. 2A) comprising a pair of joined flaps is used to direct pins along the appropriate guide channel 46, 48 as the two guide channels 46, 48 in the cam plate 42 cross.

FIG. 2C shows the pin plate 26 at the end of its relative motion with respect to the cam plate 42, with its guide channels 46, 48 defining the edges of the shaped ply. Embodiments of the invention may include interchangeable cam plates, or portions thereof, each of which with different guide channel shapes for rapidly creating different shaped plies. Accordingly, this enables use of the apparatus 40 to rapidly change the shapes of plies to be created.

In still further embodiments, a robotic pick-and-place mechanism may select one of a plurality of different cam plates and/or platens from a magazine or rack and automatically load and unload these as needed to form different ply shapes on demand.

FIG. 2D illustrates an embodiment of fixing the fiber web into a shaped ply. In this embodiment, the center portion (e.g., the platen 44) of the cam plate 42 moves toward the pin plate 26, acting as a platen to compress the fiber web against the pin plate 26 and fix it into place. Embodiments of the invention may use adhesives, mechanical fasteners, or binders such as heat-sensitive, pressure sensitive, light sensitive, or any other type of binder material to fix the fiber web. Heat, pressure, light or other energy may be applied through the platen or another part of the system to activate the binder. In some embodiments, the binder, such as a heat-sensitive thermoplastic material, a pressure sensitive adhesive, or a UV-sensitive photopolymer, may be commingled with the fiber as part of the fiber supply, applied on top of the fiber web as a liquid, film, meltable fiber, mesh, or veil, or applied to the platen surface for transfer to the fiber web.

Once the platen portion 44 of the cam plate 42 has fixed the fiber web, a pair of curved blades 56, 58 coincident with the inside walls of the cam plate guide channels 46, 48 is lowered to cut the fiber web inside of the pins 12, 14. This releases the fiber web from the pins 12, 14.

In an embodiment, the curved blades 56, 58 are similar in construction to those used with steel rule dies. In an alternate embodiment, each pin includes a slot that houses an integral blade. After fixing the fiber web, these blades are extended from their slots in the pins to cut the fiber web. In addition to these blades for cutting the edges of the fiber web, additional embodiments of the invention may include additional die cutters for cutting out interior portions of the web if that is required as part of the desired ply shape. The completed shaped ply may be removed using vacuum, electrostatic, or mechanical effectors.

In further embodiments, the completed shaped ply may be placed into a mold or preforming fixture with additional shaped plies to form a complete preform. Adhesives, thermoplastic bonding, mechanical fasteners, stitching, and so on, may be used to bond shaped plies together. These embodiments of the invention may be implemented using robotic manipulators to position each shaped ply in the correct position and orientation in the mold or preforming fixture. Alternatively, a motion stage, including for example X, Y, and theta axes, may be used to move the preforming fixture relative to each shaped ply for placement.

Figure 3A:
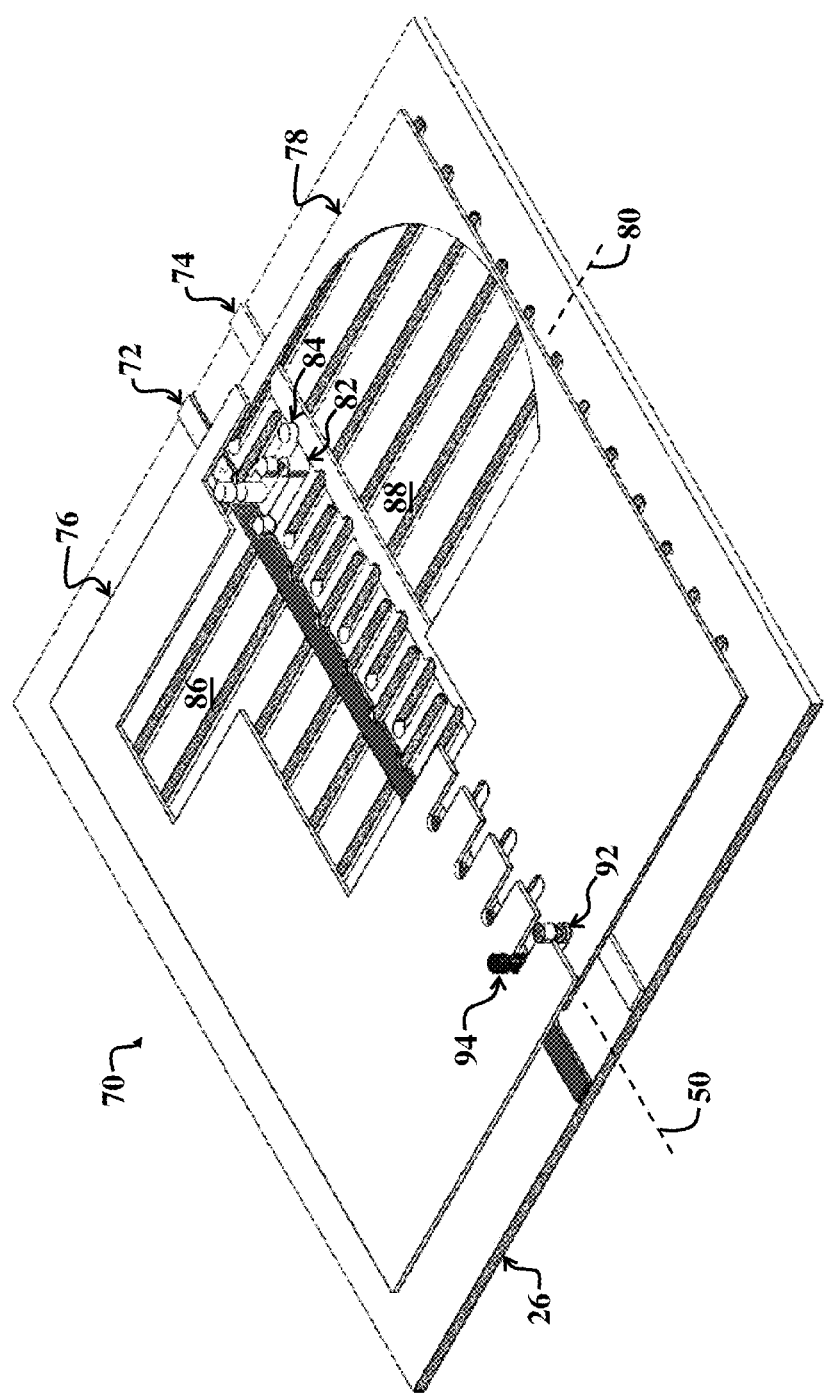
FIG. 3A illustrates a third example apparatus for creating shaped plies, which uses a template with a strategically shaped cutout, spring-loaded pins, and pin-movement arms to facilitate movement of the pins, such that the pins eventually move to positions along a path defined by the shaped cutout of the template; thereby creating a fabric web in the shape of the shaped cutout.

FIG. 3A illustrates a third example apparatus 70 for creating shaped plies, which uses a template 76, 78 (which includes two pieces) with a strategically shaped cutout 86, 88, spring-loaded pins 82, 92, 84, 94 (four examples of which are shown, while others have been omitted for clarity), and pin-movement arms 72, 74 to facilitate movement of the pins 82, 92, 84, 94. The pins 82, 92, 84, 94 eventually move to positions (called terminal positions) along a path defined by the shaped cutout 86, 88 of the template 76, 78; thereby creating a fabric web in the shape of the shaped cutout when tow is fed into the apparatus 70 in a manner analogous to that discussed with respect to FIGS. 1A-1C.

In the present example embodiment, the pin-movement arms 72, 74 are shown holding the pins 82, 84 in initial positions. Note that the other pins 92, 94 are further held in place by the templates 78, 76, such that movement of the pin-movement arms 72, 74 along a perpendicular axis 80 (i.e., perpendicular and approximately coplanar with the fiber axis 50) will not result in movement of the other pins 92, 94. The pin-movement arms 72, 74 engage with arm-engagement stubs of the pins 82, 84 and selectively confine motion of the pins 82, 84.

The pin movement arms 72, 74 are movable along the perpendicular axis 80, e.g., via actuators and/or mechanical mechanisms (or manually) while remaining parallel to the fiber axis 50. As the pin-movement arms 72, 74 move outward (i.e., away) from the fiber axis 50, spring loading (or other loading) of the pins 82, 92, 84, 94 causes the pins to separate, thereby pulling fiber threaded therebetween into the shape of the cutout 86, 88.

Note that the pins 82, 92, 84, 94 need not be spring loaded in all implementations. For example, tooling coupled underneath the apparatus 70 may employ other mechanisms (e.g., weights and accompanying rigging) for applying outward forces on the pins 82, 92, 84, 94, such that when the pin-movement arms 72 are further separated, the pins 82, 92, 84, 94 exhibit sufficient forces to pull any tow (threaded therebetween) to form a web in the shape of the cutout 86, 88 when the pin-movement arms 72, 74 fully clear the cutout 86, 88.

Furthermore, note that while in the present example embodiment, movement of the pin-movement arms 72, 74 is discussed as being along the perpendicular axis 80, that embodiments are not limited thereto. For example, in some implementations, i.e., implementations whereby pairs of pins are to be positioned, one at a time, to their terminal positions (thereby reducing forces needed to pull the tow), the pin-movement arms 72, 74 may be slid out from under the template 76, 78 along a direction parallel to the fiber axis 50. In this case, as ends of the pin-movement arms 72, 74 pass the pins 82, 84, the pins are free to move to their terminal positions defined by inner edges of the cutouts 86, 88.

Note that the template sections 76, 78 can readily be removed and replaced with new or different template sections with different cutouts. The pin-movement arms 72, 74 will continue to function with templates with different sizes of cutouts. Accordingly, the apparatus 70, including the template sections 76, 78 may act as a template-changing system that enables an arbitrary number of possibilities for changing out the template shown 76, 78 with another template.

Figure 3B:
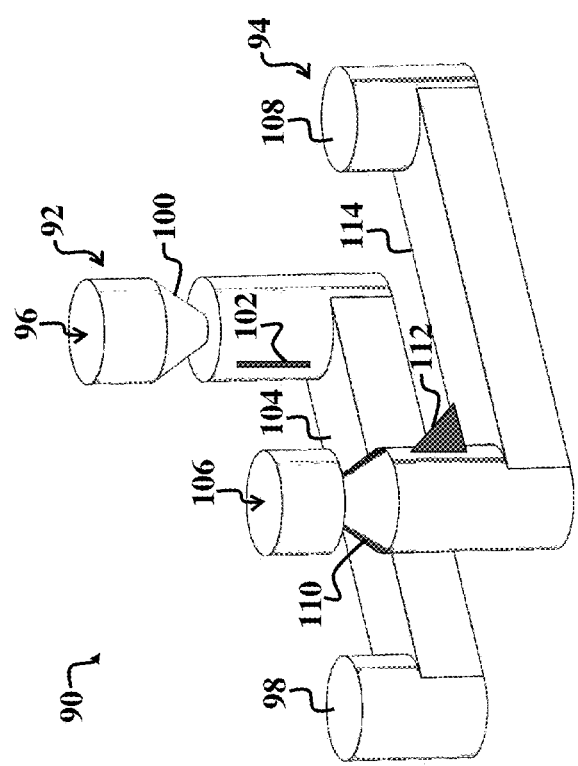
FIG. 3B illustrates example pins that are usable with the third example apparatus of FIG. 3A.

FIG. 3B illustrates example pins 90 (including a first pin 92 and a second pin 94) that are usable with the third example apparatus 70 of FIG. 3A. The first pin 92 and second pin 94 include arm-engagement stubs 98, 108, which partially extend from pin bases 104, 114. With reference to FIGS. 3A and 3B, the pin bases 104, 114 ride in slots of the pin plate 26, while the pin-engagement stubs 98, 108 engage the pin-movement arms 72, 74.

The first pin 92 includes a tow-engagement section 96, which includes a first beveled surface 100 for accommodating tow. Similarly, the second pin 94 also includes a tow-engagement section 106, but with a second beveled surface 110 that is oppositely beveled relative to the bevel of the first beveled surface 100. The opposite orientations of the bevels facilitate twisting partially flat tow (also called tow herein) from vertical to approximately coplanar relative to a plane parallel to the template 76, 78, e.g., to thereby reduce any spacing between adjacent stretches of tow (which might otherwise exhibit gaps, e.g., when partially flat tows are oriented with the partially flat sides being perpendicular to a plane of the template 76, 78).

For illustrative purposes, the second pin 94 is shown including a tow-cutting blade 112, which may be used to cut loose a ply from the apparatus 70 of FIG. 3A when a platen in the shape of the cutout 86, 88 presses portions of the tow that wrap around the tow-engagement section 106 (and ride in a groove characterized by the second beveled surface 110). The tow-cutting blade 112 may be fixed and/or retractable, depending upon the needs of a given implementation.

Another tow-cutting blade 102 of the first pin 92 is shown retracted into the first tow-engagement section 96. When using retractable blades, the blades may be selectively actuated, e.g., to extend from the tow-engagement section 96 to selectively cut the tow that warps around the first tow-engagement section 96 (e.g., so as to facilitate releasing a shaped ply). Note that absent use of retractable blades, the blades 102, 112 may be used to cut the tow responsive to application of a platen to the associated fiber web during and/or after bonding of the fiber web into a shaped ply.

Furthermore, pins need not have individual blades, e.g., the blades 102, 112, for releasing a given shaped ply from the apparatus 70 of FIG. 3A. For example, other ply-releasing mechanisms, such as flexible blades that snake between pins and ride in blade-holding slots (not shown) that may be cut into the tow-engagement sections 96, 106, could be used to facilitate release of a shaped ply from the apparatus 70 of FIG. 3A.

Figure 3C:
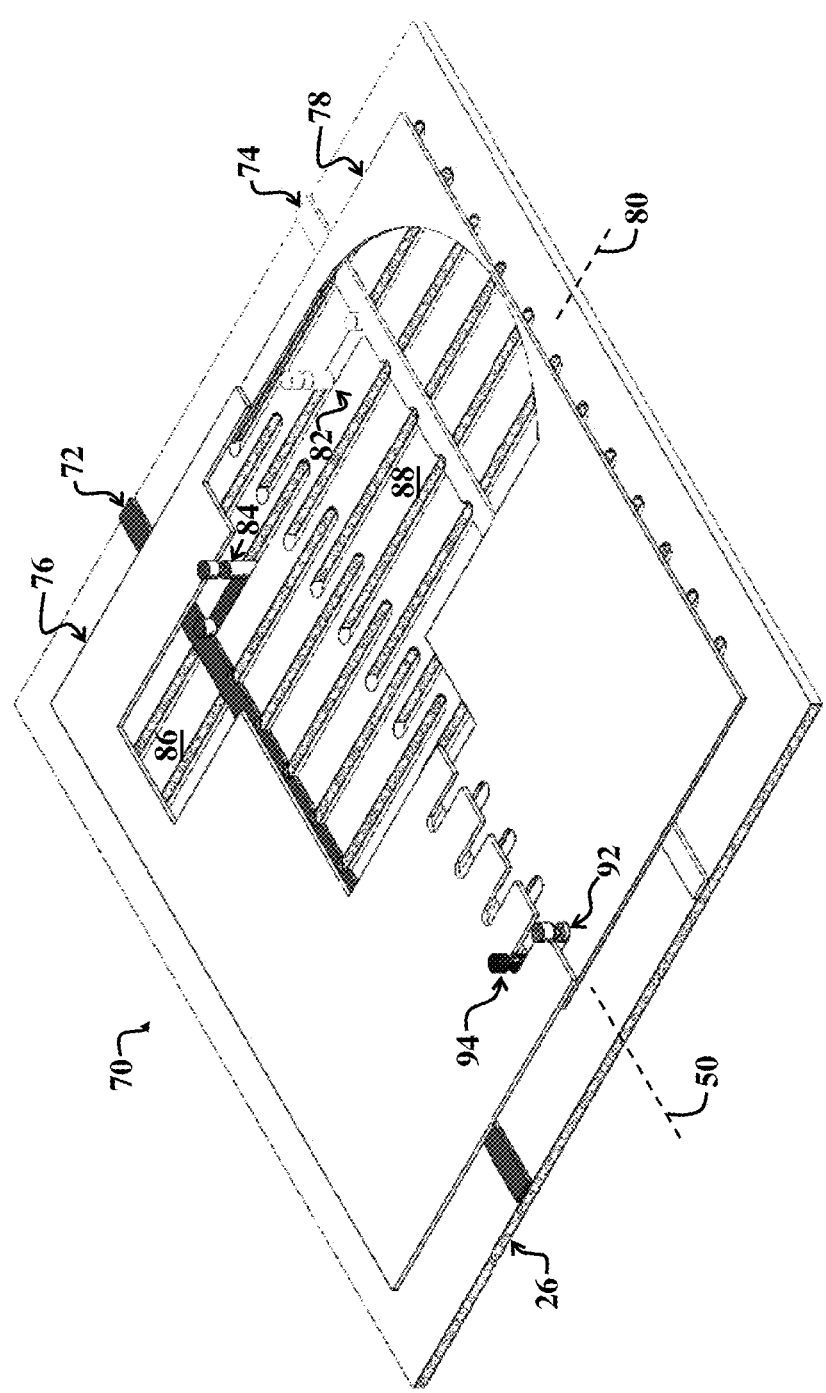
FIG. 3C illustrates the third example apparatus of FIG. 3A after example pins are allowed to partially move in response to movement of the pin-movement arms.

FIG. 3C illustrates the third example apparatus 70 of FIG. 3A after example pins 82, 84 are allowed to partially move in response to movement of the pin-movement arms 72, 74 along the perpendicular axis 80 and away from the fiber axis 50.

Figure 3D:
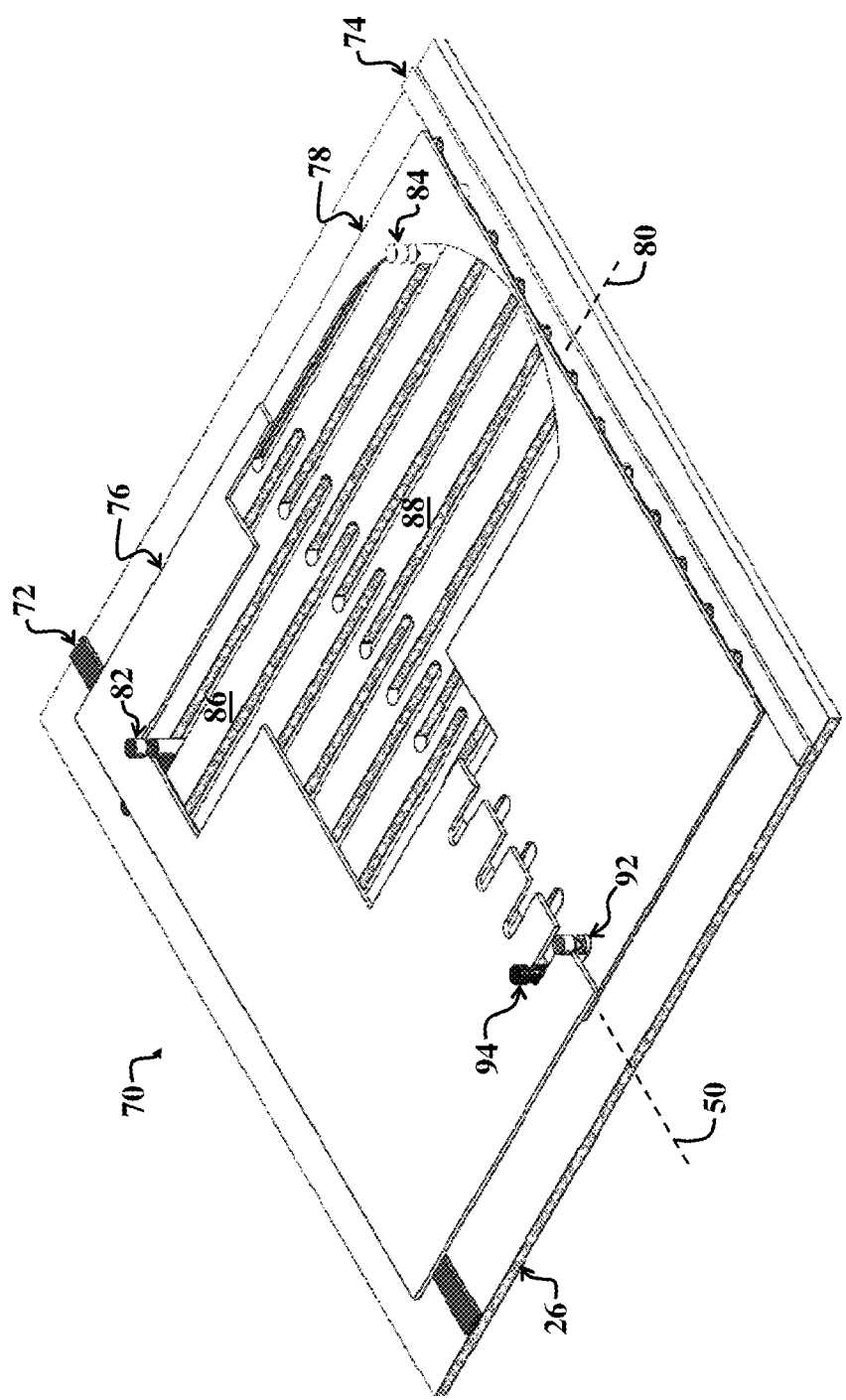
FIG. 3D illustrates the third example apparatus of FIG. 3C after the example pins reach terminal positions defined by interior edges of the shaped cutout, as the pin-movement arms are fully separated.

FIG. 3D illustrates the third example apparatus 70 of FIG. 3C after the example pins 82, 84 reach terminal positions defined by interior edges of the shaped cutout 86, 88 as the pin-movement arms 72, 74 are fully separated.

In summary, in FIGS. 2A-3D, the platen is illustrated as a flat plate. However, as discussed more fully below, further embodiments of the invention may utilize a non-planar platen, such as a platen having a contoured three-dimensional shape corresponding with the shape of all or a portion of a preform. This allows embodiments of the invention to form shaped plies with curvature and non-planar shapes. In this embodiment, additional fiber is pulled from the fiber supply as the platen contacts the fiber web and deforms the fiber web under tension from its substantially flat shape to a curved shape. Because the fiber web is not fixed until after the platen has deformed the fiber web into a non-planar shape, each row of the fiber web is free to move and shear with respect to its neighbor, avoiding many of the problems associated with draping flat fabrics.

In still a further embodiment, the platen does not have to match the curved shape of the preform. Instead, the platen may have a profile shape adding extra fiber to each row of the fiber web so that the length of each row matches the length of a geodesic curve of the preform. In this embodiment, portions of the fiber web may not need to be fixed in place when forming the shaped ply, as these fibers will set themselves into the desired position once the shaped ply is placed in the mold or layup tool.

In yet another embodiment, the platen may be omitted and a set of actuated pins may be used to flatten and fix the fiber web. The set of actuated pins may be a two-dimensional array covering the entire work area of the system, or alternatively a one-dimensional array mounted on a moving rail to flatten and fix each row of the fiber web in sequence. In the latter example, the rail may move from the farthest side of the pin plate towards to the fiber supply, so that additional fiber may be supplied as needed if forming non-planar shaped plies.

In some applications, shaped plies may require interior cuts or concave edges between adjacent pins. For these applications, the platen may include additional blades to cut excess portions of the shaped ply away after the fiber web has been fixed.

It may be desirable for some applications to steer the fiber around interior holes or concave edges, rather than cutting away excess fibers. In an embodiment, conical protrusions in the platen may be used to direct the fiber web along curved paths around interior holes and concave edges.

FIGS. 3A-3D illustrate another mechanical template system for forming shaped plies. In FIGS. 3A-3D, the platen for fixing the fiber web and the fiber supply are omitted for clarity. The embodiments of FIGS. 3A-3D operate in a similar manner as described above, including drawing fiber from a supply along a fiber axis between two sets of pins, moving the pins across the fiber axis to form a fiber web in the desired ply shape, fixing the fiber web to form a shaped ply, and releasing the shaped ply. However, the embodiments of FIGS. 3A-3D utilize a different mechanism for moving pins to the shape of the edges of the desired ply shape.

FIG. 3A illustrates a pin plate including guide channels for defining ranges of pin motion. Pins are inserted into the pin plate guide channels. In FIGS. 3A-3D, only a portion of the pins are shown for clarity.

FIG. 3B illustrates details of an embodiment of the pins. In this embodiment, the odd and even guide channels of the pin plate use pins with conical recesses facing upwards and downwards, respectively. The conical recesses tilt the fiber at an angle with respect to the pin plate to assist in consistently flattening the fiber with the platen (not shown). By alternating the direction of the conical recesses in adjacent pin guide channels, the angle of the fiber as it engages with the conical recesses remains the same and the fiber is prevented from twisting as the web is formed. Additionally, in this embodiment, each pin includes extension with a boss at the end.

Returning to FIG. 3A, a pair of moveable pin arms is located above the pin plate. Each pin arm engages with the bosses of either the odd or even row pins. The moveable pin arms allow the odd and even row pins to move from their initial positions, across the fiber axis, and to the edges of the pin plate. The extension arms and bosses on the pins ensure that each moveable pin arm does not have to cross the fiber axis and does not mechanically interfere with the other pin arm or the other set of pins.

In one embodiment, the pins are pushed from their initial positions towards the edges of the pin plate by springs or counterweights. In this embodiment, pins are pressed against the moveable pin arms. As the moveable pin arms move outward, the pins remain in contact with the pin arms. This is illustrated in FIG. 3C. In an alternate embodiment, magnets or mechanical latches are used to keep the pins in contact with the pin arms as the pin arms move outward.

A mechanical ply template corresponding with the desired ply shape is placed over the pin plate and the moveable pin arms. As the moveable pin arms allow the pins to move towards the edge of the pin plate, the pins come into contact with portions of the mechanical ply template. The mechanical ply template stops the motion of the contacting pins, while allowing the moveable pin arms and uncontacted pins to continue their outward motion. When all of the pins have come into contact with the mechanical ply template, the pins are arranged in the shape of the edges of the desired ply shape.

The movements of the pin arms and pins illustrated by FIGS. 3A-3D are used to form a fiber web. Similar to the other embodiments, the fiber web is then fixed to form a shaped ply, and the shape ply is released from the pins and removed from the system. After the shaped ply is removed, the pin arms reverse direction and return to their initial positions. As the pin arms move inward, they reengage with the pins and move them away from the mechanical ply template back to their initial positions on the opposite sides of the fiber axis. This embodiment is then ready to form another shaped ply.

Embodiments of the invention may include interchangeable ply templates, or portions thereof, each of which with different edge shapes, to quickly change ply shape. In still further embodiments, a mechanism may select one of a plurality of different ply templates from a magazine or rack and automatically load and unload these as needed to form different ply shapes on demand. In addition, a ply template may include portions that retain pins in their initial positions, allowing the formation of ply shapes that are less than the full length of the pin plate. This is shown in FIG. 3D, with one pair of pins retained in its initial position even after the pin arms have moved to their outside motion limits. In still further embodiments, each ply template may be used to form two or more shaped plies at the same time, with the same or different shape.

Figure 3E:
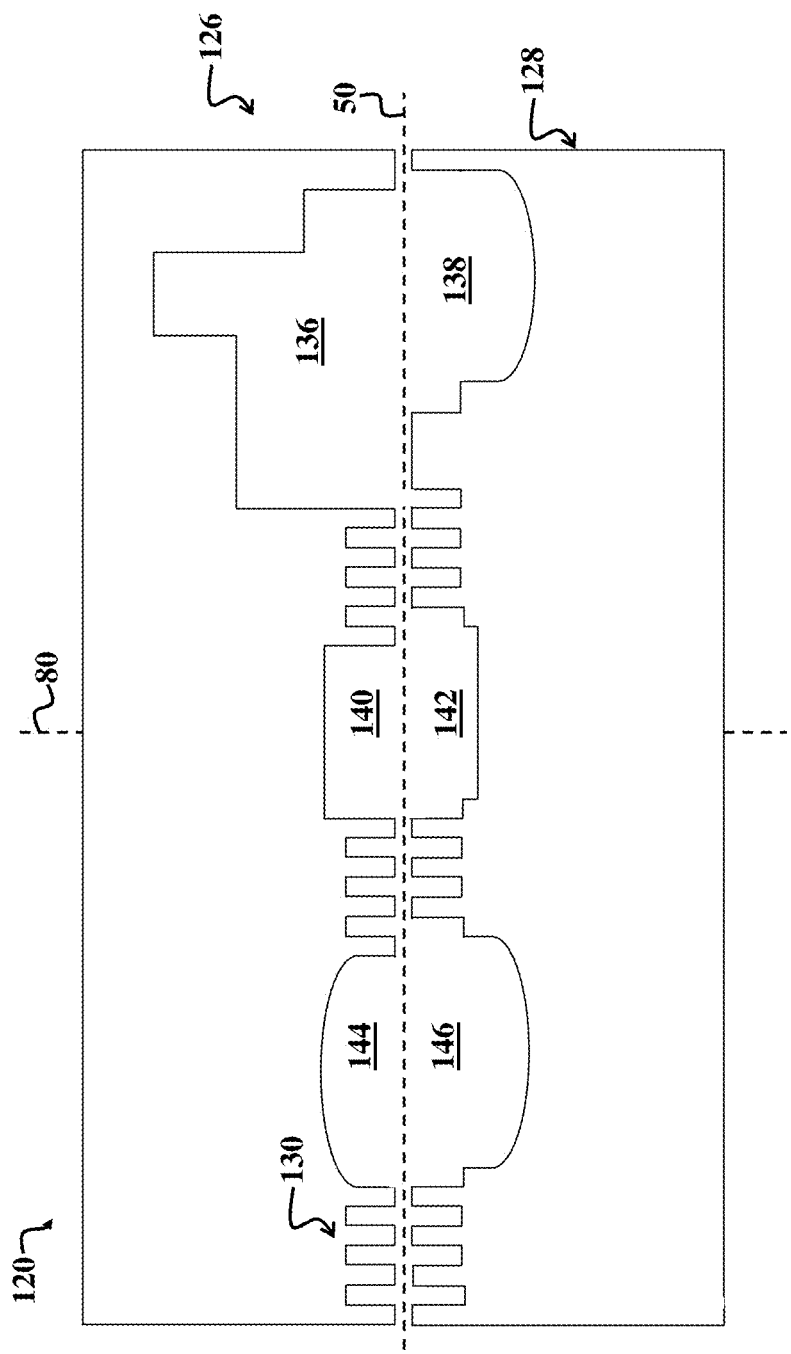
FIG. 3E illustrates a second example template that is usable with the third example apparatus of FIG. 3A, which includes plural cutouts for an example kit to be created using the third example apparatus of FIG. 3A.

FIG. 3E illustrates a second example template 120 that is usable with the third example apparatus 70 of FIG. 3A, which includes plural cutouts 136-146 for an example kit to be created using the third example apparatus 70 of FIG. 3A. The second example template 120 includes a first template section 126 and a second template section 128 that are used to form a first cutout 136, 138, a second cutout 140, 142, and a third cutout 144, 146, that facilitate simultaneous production of plies in the shapes defined by the cutouts.

Note that in practice, and during operation, the first template section 126 and the second template section 128 may be moved together along the perpendicular axis 80, analogous to what is shown in FIG. 3A. During use, distances between the template sections 126, 128 as measured along the perpendicular axis may vary, e.g., depending upon initial pin spacing (when the pins are at their initial positions) and depths of template teeth 130.

Furthermore, note that spacing of the cutouts 136, 138; 140, 142; and 144, 146 may be moved closer together along the fiber axis 50, e.g., if extra tow between the cutouts 136, 138; 140, 142; and 144, 146 is not to be used for the kit to be formed. Furthermore, note that the cutouts 136, 138; 140, 142; and 144, 146, which represent plural sub-shapes, may form all or only a portion of a kit, or may be completely unrelated, i.e., not part of a given kit.

Figure 4A:
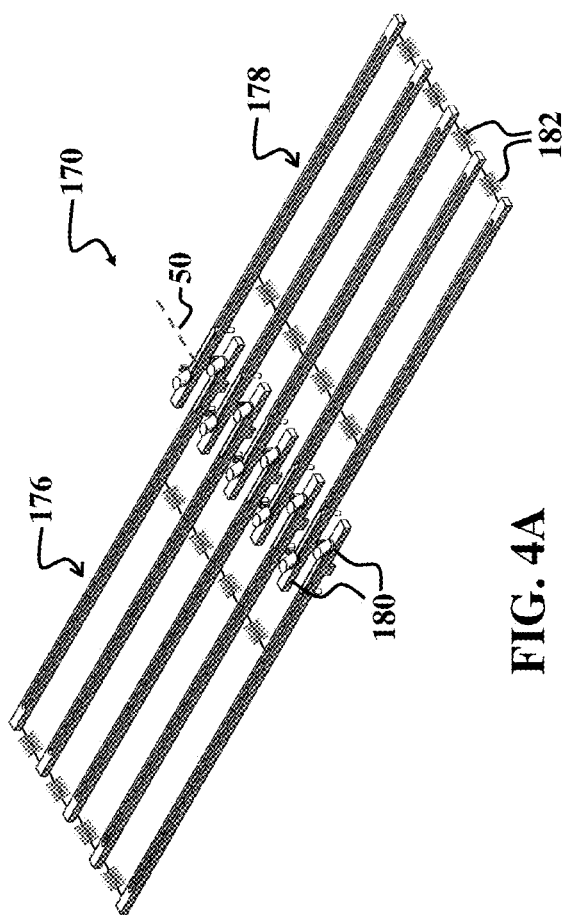
FIG. 4A illustrates an example set of pin guides and pins therein, which are usable with embodiments and principles discussed herein, and wherein spacings (along the initial fiber axis) of the pin guides and accompanying pins can be selectively adjusted, e.g., via springs or an underlying scissor assembly, thereby facilitating control over variations in fiber density of a web formed between the pins after actuation of the pins along the pin guides.

FIG. 4A illustrates an example set of pin guides 170 (including a first set of pin guides 176 and a second set of pin guides 178) and accompanying and pins 180 therein are usable with embodiments and principles discussed herein. Spacings (along the initial fiber axis 50) of the pin guides 176, 178 and accompanying pins 180 can be selectively adjusted, e.g., via springs 182 or an underlying scissor assembly, thereby facilitating control over the tightness of the fiber web formed between the pins 180 after actuation of the pins 180 along the pin guides 176, 178.

Figure 4B:
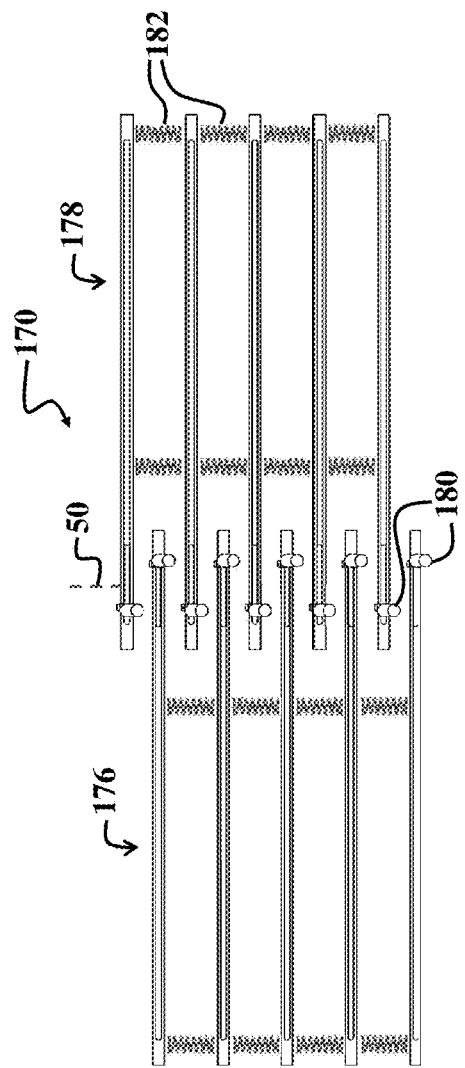
FIG. 4B is a top view of the example set of pin guides and pins of FIG. 4A.

FIG. 4B is a top view of the example set of pin guides 176, 178 and pins 180 of FIG. 4A. As shown in FIG. 4B, the pins guides 176, 178 are sufficiently separated (i.e., spaced) along the fiber axis 50 to facilitate accommodation of relatively thick tow, while still allowing the pins 180 to readily pass each other when crossing the fiber axis 50.

Figure 4C:
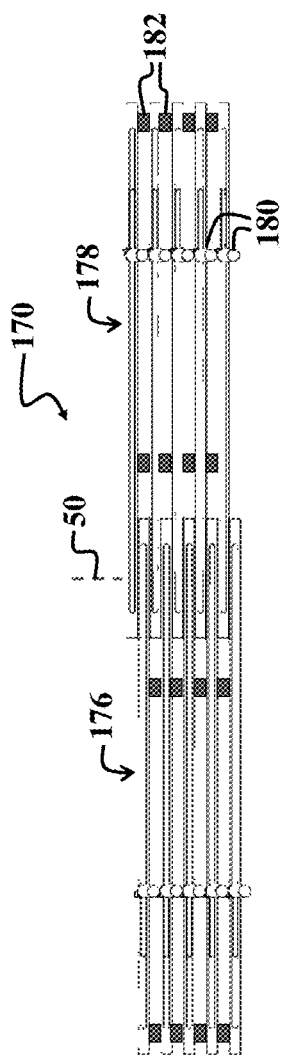
FIG. 4C is a top view of the example set of pin guides and pins of FIG. 4A after spacings between the pin guides and pins have been fully minimized, and after the accompanying pins have passed across the initial fiber axis, thereby resulting in a relatively tight weave for any subsequently formed shaped ply defined by the terminal pin positions.

FIG. 4C is a top view of the example set 170 of pin guides 176, 178 and pins 180 of FIG. 4A after spacings between the pin guides 176, 178 and pins 180 have been fully minimized, and after the accompanying pins 180 have passed across the initial fiber axis 50. Movement of the pin guides 176, 178 closer together along the fiber axis 50 after the pins 180 have crossed the fiber axis 50 facilitate creating a relatively tight weave for any subsequently formed shaped ply that is defined by the terminal pin positions. In the present example embodiment, the terminal positions of the pins 180 as shown would define a rectangular shape for a fiber web that includes tow that snakes between pins of the first pin guides 176 and pins of the second pin guides 178.

Figure 4D:
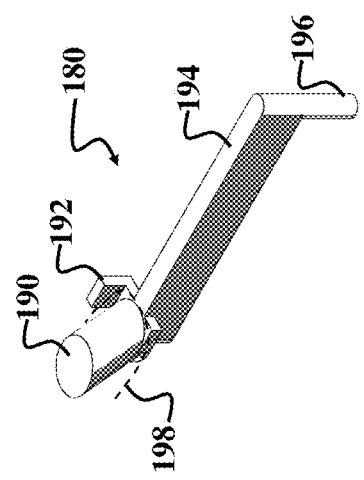
FIG. 4D illustrates an example selectively angled pin that is usable with the pin guides of FIG. 4A.

FIG. 4D illustrates an example selectively angled pin 180 that is usable with the pin guides 176, 178 of FIG. 4A. The example pin 180 includes an angled pin protrusion 190, the curved surface of which includes or represents a fiber-engaging surface, i.e., a surface that makes contact with fiber as a fiber web is being constructed.

An example fiber path 198 extends around a backside of the protrusion and is retained against the angled protrusion 190 via retaining lip 192. With reference to FIGS. 4A and 4D, note that the angles of the fiber-engaging surfaces of adjacent pins (i.e., adjacent along the fiber axis 50) are oppositely angled. This may facilitate flattening certain types of tow via a platen, thereby facilitating removing or minimizing gaps between adjacent stretches of tow in a given fiber web.

Hence, FIG. 4D illustrates a detail view of another pin design, as used by the embodiment of FIGS. 4A-4C. In this pin design, the pins are angled so that the fiber is tilted at an angle with respect to the pin plate to assist in consistently flattening the fiber with the platen. The direction of pin tilt is mirrored for adjacent pin channels as shown in FIGS. 4A-4C, so that the angle of the fiber as it engages with the angled pins remains the same, and the fiber is prevented from twisting as the web is formed. In a further embodiment, the retaining lip 192 is included near the base of the angled pin protrusion 190 to retain the fiber in a fixed position (i.e., to fix the fiber path 198) as the fiber web is flattened with the platen. Additionally, in this embodiment, each pin optionally includes an extended body 194 with a protruding boss 196 at the end to allow for its use with pin movement mechanisms such as that illustrated by FIGS. 3A-3D.

In summary, with reference to FIGS. 4A-4E, the spacing (along the fiber axis 50) between the pin guides 176, 178 can be varied to adjust the angular orientation of the fibers in the fiber web and reduce or eliminate gaps between adjacent rows of the fiber web. FIG. 4A illustrates a perspective view of an embodiment of the invention with the pins located at the maximum spacing. FIG. 4B illustrates a top view of the same configuration.

In the embodiment of FIGS. 4A-4E, the pin plate (e.g., pin plate 26 of FIG. 3D) with guide channels used in other embodiments is replaced by a set of separate pin guides 176, 178, with each pin 180 constrained by its own pin guide 176, 178.

The pin guides 176, 178 may be moved independently to adjust the spacing (along the fiber axis 50) between pins 180, and hence the spacing and angular orientation of the rows of fiber in the fiber web (e.g., the web made from fiber tow that snakes between the pins 180). In an embodiment, it is desirable to set the pin spacing so a line between the fiber engaging surface of one pin and the corresponding surface of the adjacent pin is substantially parallel to the path of pin motion.

Embodiments of the invention may move the pin guides in a number of different ways. But, as an example, compression springs 182 couple each pair of adjacent pin guides 176, 178. The outermost pin guides 176, 178 can then be moved closer or further apart from each other. If the compression springs in this embodiment have the same spring constant, then the inner pin guides will be equally spaced between the outermost pin guides.

In another embodiment, a scissor or tong linkage connects with sliding joints on the pin guides 176, 178. As the linkage is expanded or contracted, the separation between pin guides is increased or decreased accordingly. In still a further embodiment, a sliding cam plate may be moved to adjust the spacing between pin guides. In yet another embodiment, one or more linear actuators may be used to adjust the spacing between pin guides independently.

As shown in FIG. 4B, an embodiment of the invention sets the pin spacing to a larger value when the pins 180 are in their initial positions to ensure adjacent pins 180 can pass each other as they move across the fiber axis 50 to opposite sides of the pin channels in the pin guides 176, 178. After the pins 180 have passed across the fiber axis 50 and are clear of their adjacent pins, the pin spacing can be reduced to the desired amount, for example as shown in FIG. 4C. The independently moving pin guides 176, 178 can be used with other embodiments discussed herein, including the example embodiments of FIGS. 1A-3E.

Figure 5A:
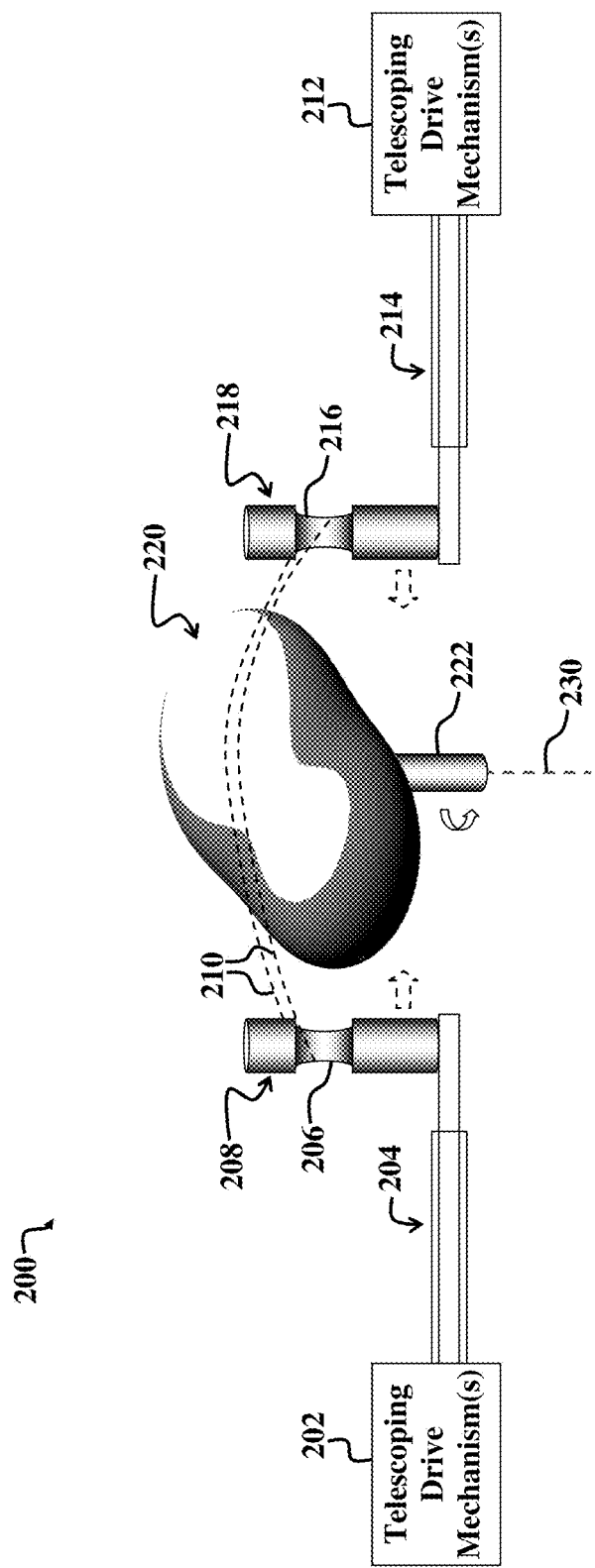
FIG. 5A illustrates a forth example apparatus with pins mounted on telescoping slides, which are usable to create an open space beneath a three-dimensional rotatable platen, which can be used, in accordance with embodiments and principles discussed herein, to create multiple similarly shaped three-dimensional plies (i.e., plies with doubly curved surfaces) and preforms with crisscrossed fiber patterns.

FIG. 5A illustrates a forth example apparatus 200 with pins 208, 218 mounted on telescoping slides 203, 214, which are usable to create an open space beneath a doubly-curved rotatable platen 220. The three-dimensional platen 220 exhibits a curved surface that will act as both a template and a platen to facilitate creating similarly shaped three-dimensional plies (i.e., plies with curved surfaces) and preforms with crisscrossed fiber patterns.

For clarity, only two opposing pins 208, 218 and accompanying sliding members 204, 214 are shown. Telescoping drive mechanisms 202, 212 facilitate selectively moving the pins 208, 218 mounted thereon into terminal positions abutting edges of the three-dimensional paten 220. Fiber tow snaking between opposing pins 208, 218 drapes over the doubly curved surface of the platen 220, forming an example tow path 210 over the surface of the platen 220.

After an initial fiber web (corresponding to the example tow path 210 in FIG. 5A) is created, the platen 220 is selectively pressed into the web, e.g., so as to draw out more fiber from a fiber supply (e.g., fiber spool) to accommodate the bulging in the fiber web as needed to create the resulting three-dimensional shaped ply (with a doubly curved surface) conforming to a surface of the three-dimensional platen 220. The example pins 208, 218 include fiber-engaging surfaces of respective slots 206, 216, which may facilitate holding the web 210 to the pins while the platen 220 is extended into the web 210.

Alternatively, or in addition, the web 210 can be sandwiched between two different but complimentary platens, wherein one platen is applied from below the fiber web 210, and another platen is applied from above the fiber web 210.

In the present example embodiment, the platen 220 is mounted on a rotatable spindle 222, which may rotate about a rotation axis 230; and not just extend and retract along the axis 230 (where vertical movement control represents control over elevation of the platen 220 relative to the movable pins 208, 218).

To fix (i.e., to bind fibers to facilitate creating a ply) the web 210 formed using the three-dimensional platen 220 can include thermally activated binder material among the fibers of the tow. The platen 220 may be heated to bind fibers of the web 210, and then one or more blades, which may or may not be attached to the pins and/or the platen 220 can then readily be used to cut free the resulting ply from the fourth example apparatus 200. Note that embodiments are not limited to use with blades to cut plies. For example, laser cutting or other ply-release mechanisms may be employed, without departing from the scope of the present teachings.

To create a second ply of a similar shape, but with different fiber orientations, a new web is created, and the platen 220 is rotated by a desired angle, so as to set approximate angles between adjacent fibers when the resulting second ply is released from the apparatus 200 and stacked with the first ply.

Figure 5C:
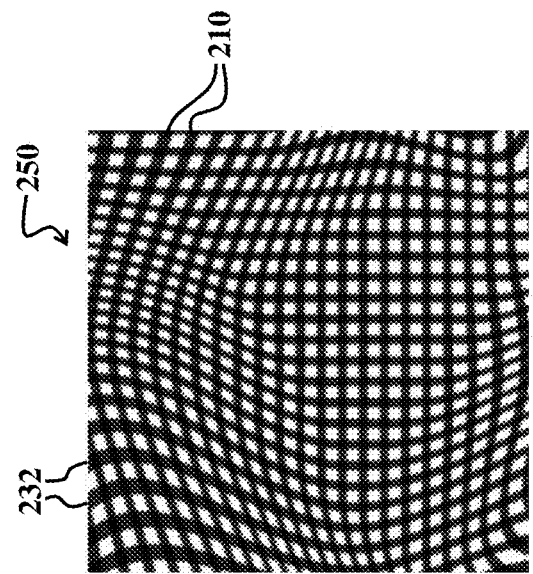
FIG. 5C illustrates an example fiber pattern formed by two stacked plies with different fiber orientations but similar shapes as created by the fourth example apparatus of FIG. 5A.
Figure 5B:
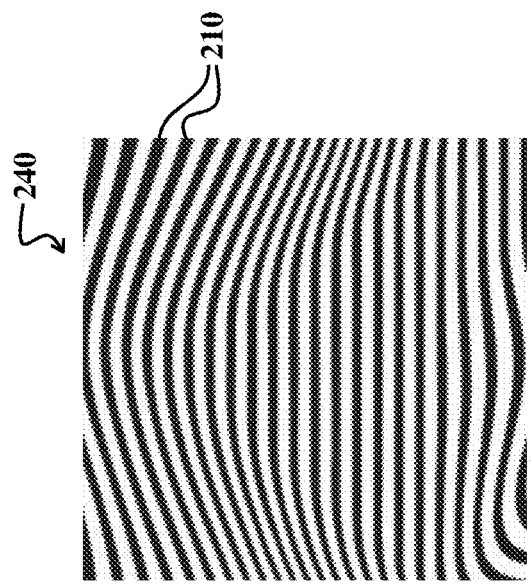
FIG. 5B illustrates an example fiber pattern of a single ply created using the example embodiment of FIG. 5A.

FIG. 5B illustrates an example fiber pattern 210 of a single ply 240 created using the example embodiment of FIG. 5A. The single ply 240 exhibits a curved surface resulting from using the three-dimensional platen 220 of FIG. 5A.

FIG. 5C illustrates an example fiber pattern 210, 232 formed by two stacked plies 250 with different fiber orientations but similar shapes as created by the fourth example apparatus 200 of FIG. 5A.

Figure 6:
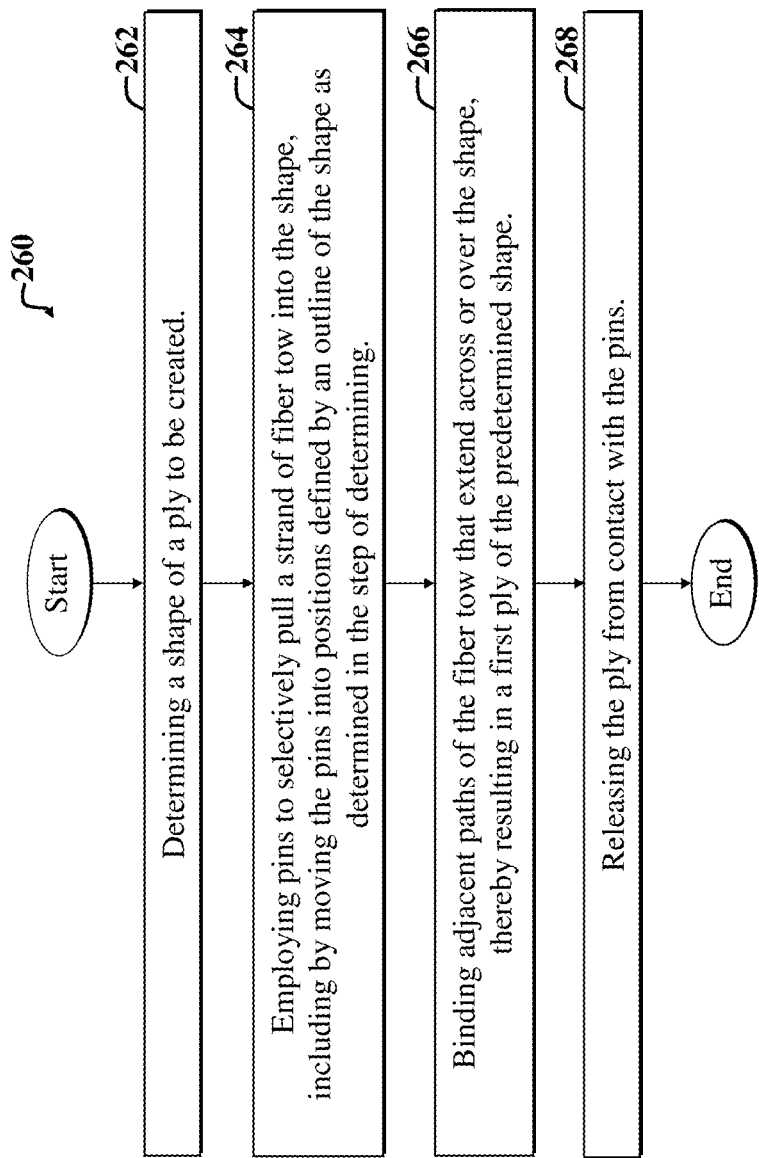
FIG. 6 is a flow diagram of first example method implementable via embodiments discussed herein.

FIG. 6 is a flow diagram of first example method 260 implementable via embodiments discussed herein. The example method 260 facilitates arranging creating one or more plies. The one or more plies represent one or more layers of fibers that are arranged in a predetermined shape.

The first example method 260 an initial shape-determining step 262, which involves determining or otherwise defining the predetermined shape. For example, with reference to FIGS. 2A and 3A, the shape may be defined using the platen 44 of the cam plate 42 of FIG. 2A; the interior cutout of the template 76, 78 of FIG. 3A, and so on.

Next, a pin-employing step 264 includes employing pins to selectively pull a fiber tow into the shape, including by moving the pins into positions defined by an outline of the shape as determined the shape-determining step 262. Examples of pins in their terminal positions as defined by the shape outline include the positions of the pins 12, 14 in FIG. 2E; the positions of the pins 82, 84 in FIG. 3D.

Subsequently, a fiber web-fixing step 266 includes binding adjacent portions of the fiber tow that extend across or over the shape, thereby resulting in a first ply of the predetermined shape.

Next, a ply-releasing releasing step 268 includes releasing the ply from contact with the pins. Mechanisms for cutting a ply loose from the pins and accompanying ply-forming apparatus include the shaped blades 56, 58 in FIG. 2E, and the pin blades 112, 102 in FIG. 3B.

Note that the method 260 of FIG. 6 may be modified, without departing from the scope of the present teachings. For example, the method 260 may be further specify that the ply-releasing step 268 includes cutting the fiber tow loose from each pin using a blade. The blade can include a separate blade coupled to each pin. Alternatively, or in addition, a flexible (or otherwise shapeable) blade is arranged to or otherwise bent to conform to a path that is defined by the positions of the pins defined by an outline of the shape.

The first example method 260 of FIG. 6 may further specify that the predetermined shape includes a three-dimensional shape and that a template is used to facilitate defining or otherwise specifying the shape. For example with reference to FIG. 5A, the platen 220 may act as a template that is usable to define terminal positions of the pins 208, 218 as the pins 208, 218 extend to abut the platen 220. In such case, the platen 220 includes outer edges that restrain or otherwise fix positions of the pins 208, 218 on opposite sides of the template 220, such that the fiber tow drapes over (or otherwise conforms to a surface of) an external shape of (or an internal shape as with the templates 76, 78 of FIG. 3C).

Accordingly, the template may include a three-dimensional template (e.g., the platen 220 of FIG. 5A), and wherein the predetermined shape includes a three-dimensional shape, i.e., a shape with one or more curved surfaces. The three-dimensional template may be a heatable platen that is usable to thermally activate binder material included in the fiber tow, so as to implement the fiber fixing/binding step 266.

The first example method 260 may further include an additional step for selectively rotating the three-dimensional template, wherein the rotation begins from a first orientation and rotates to a second orientation about a rotation axis.

After the rotation, a second ply can be created, wherein the second play also exhibits the predetermined shape. Fibers of the tow of the second ply are angled differently from fibers of the tow of the first ply depending upon the angle by which the three-dimensional template has been rotated between the first orientation and the second orientation. Examples of crisscrossed fibers of two stacked similarly-shaped plies are shown in FIGS. 5B and 5C.

The example method 260 of FIG. 6 may be further modified to specify that the determined shape includes plural sub-shapes that comprise shapes of a kit for a preform. Examples of a template with plural cutouts for an example kit are shown in FIG. 3E, which includes cutouts 136-146.

The template 120 of FIG. 3E is said to exhibit plural shapes, and the interior shapes of the cutouts 136-138 define or otherwise constrain terminal positions of the pins. Alternatively, or in addition, a platen with plural shapes is used instead of a template with plural cutouts, when creating multiple plies for a particular kit. The platen may both define the plural shapes and facilitate bonding the fiber tow.

The first example method 260 may further include drawing fiber from a supply of fiber along a fiber axis between two opposing sets of pins; moving the opposing pins across an initial center fiber axis to form a fiber web in the predetermined shape; and fixing the fiber web, using a binder material, so as to form a shaped ply characterized by the predetermined shape.

Note that method 260 may be virtually replaced with a different method, without departing from the scope of the present teachings. An alternative example method for forming a shaped ply of fibers includes drawing one or more fibers between opposing sets of pins along an initial fiber axis. The opposing sets of pins include a first set of movable first pins; and a second set of movable second pins. Pins of the first set of pins and pins of the second column of pins are movable laterally relative to the initial fiber axis.

The first pins are initially staggered relative to the second pins, such that the first pins can move past adjacent second pins and vice versa, when the first pins and/or second pins are moved laterally relative to the initial fiber axis. The alternative example method may further involve selectively moving the first pins and the second pins across the initial fiber axis, thereby pulling the one or more fibers into a web of a predetermined shape formed by resulting positions of the first pins and the second pins. Then, fibers of the fiber web are fixed, e.g., bonded before being cut loose from the accompanying apparatus.

The opposing sets of pins initially include opposing columns of pins. The first set of movable pins initially includes a first column of the first pins. The second set of movable pins initially includes a second column of the second pins.

Figure 7:
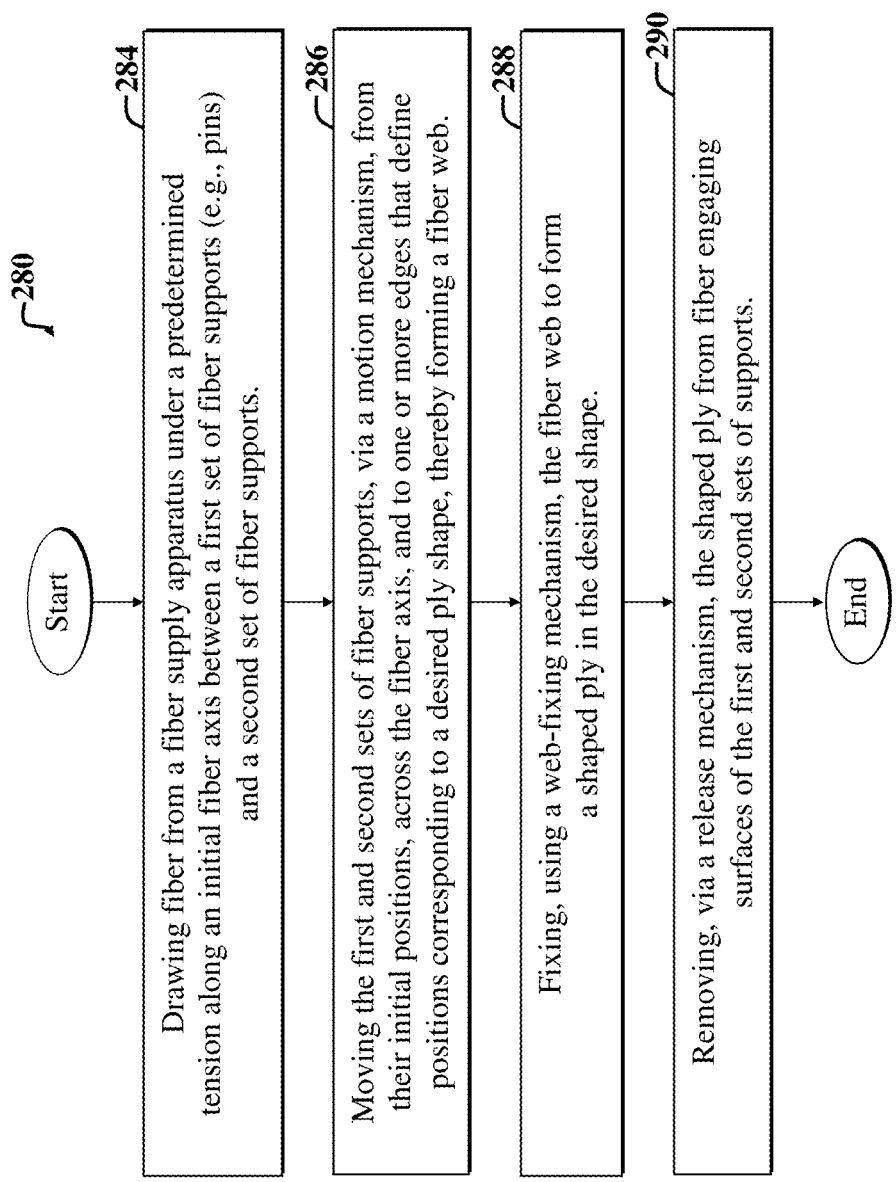
FIG. 7 is a flow diagram of a second example method implementable via embodiments discussed herein.

FIG. 7 is a flow diagram of a second example method 280 implementable via embodiments discussed herein. The second example method 280 facilitates fabricating shaped plies for composite structures.

A first step 284 involves—drawing the fiber from a fiber supply apparatus (e.g., including the spool 20 of FIGS. 1A-1C) under a predetermined tension along an initial fiber axis (e.g., the axis 50 of FIGS. 1A-1C) between a first set of fiber supports (e.g., pins) and a second set of fiber supports.

The first and second sets of fiber supports (also called support sets) may be initially positioned on opposite sides of the fiber axis. Each support (e.g., pin) of each set of fiber supports may also include a surface (e.g., a surface of the angled protrusion 190 of the pin of FIG. 4D) that engages with or otherwise comes in contact with the fiber, e.g., fiber tow, used to make plies in accordance with embodiments discussed herein.

A second step 284 includes moving the first and second sets of fiber supports (e.g., the first pins 12 and second pins 14 of FIGS. 1A-2E), via a motion mechanism, from their initial positions, across the fiber axis, to edge-defining positions (e.g., the terminal pin positions 12, 14 of FIG. 2E) corresponding with a desired ply shape, thereby forming a fiber web (e.g., the web 36 of FIG. 1C).

A third step 288 includes using a fiber web-fixing mechanism to form a shaped ply, e.g., by binding adjacent fiber courses in the fiber web via a binder or other glue mechanism.

Lastly, a fourth step 290 includes removing, via a release mechanism, the shaped ply from fiber engaging surfaces of the first and second sets of supports.

Note that the second example method 280 may be modified, without departing from the scope of the present teachings. For example, the method 280 may further specify that the first and second support sets comprise pins. The motion mechanism may include a mechanical template defining edge positions of (members, e.g., pins of) the first and second support sets.

The second example method may further include a template changing system or mechanism for installing any one of a plurality of mechanical templates in the system for use with the motion mechanism. The web fixing mechanism may include a platen adapted to compress and bond the fiber web.

The platen may melt a thermoplastic binder to bond the fiber web. Furthermore, the platen may be non-planer, e.g., it may be three-dimensional, such that it is not confined to a two-dimensional plane.

Figure 8:
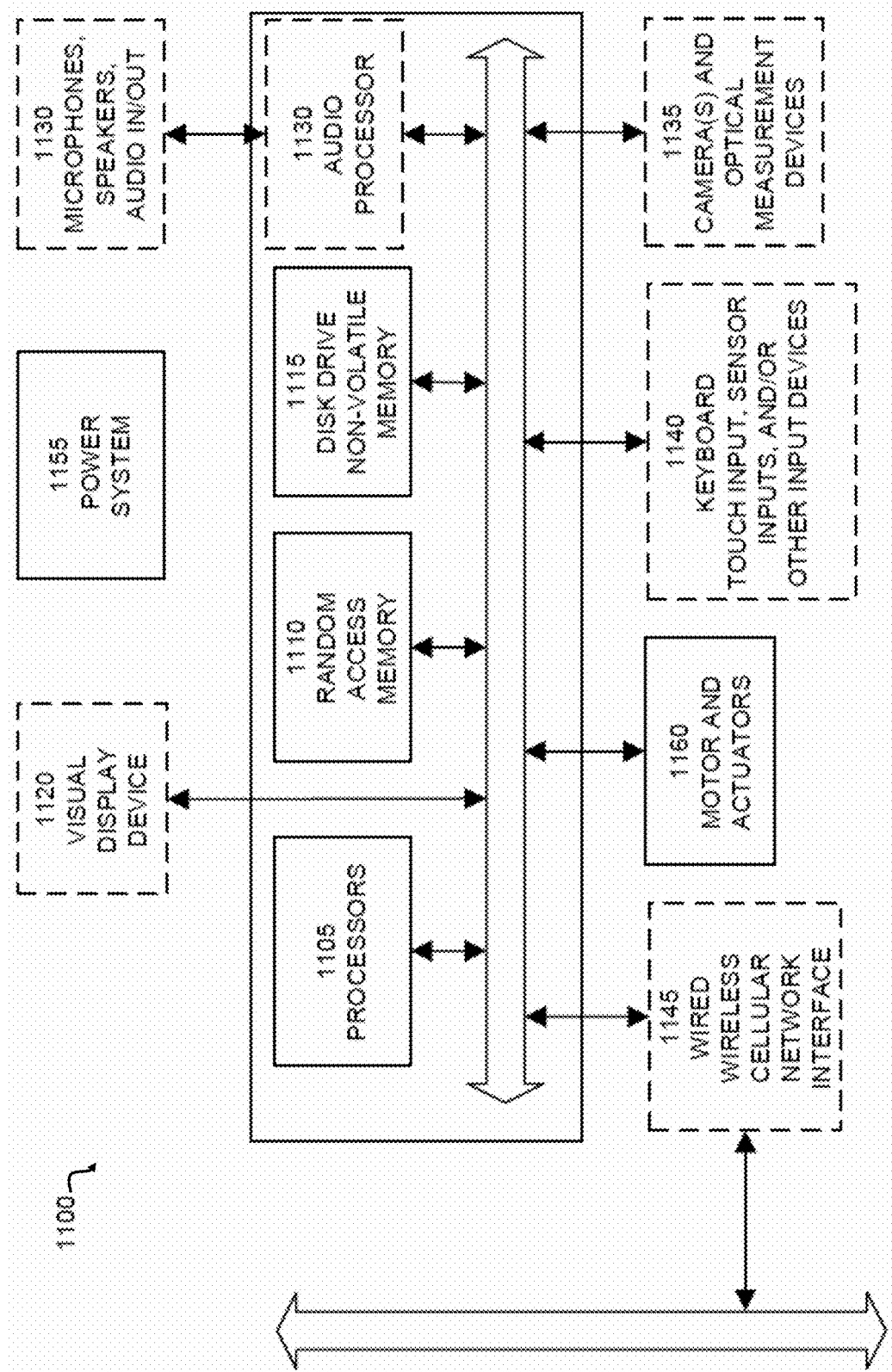
FIG. 8 is a general block diagram of an example computing system usable to control operation of embodiments discussed herein when the embodiments are automated.

FIG. 8 is a general block diagram of an example computing system 1100 usable to control operation of embodiments discussed herein when the embodiments are automated and employ a computer system to run software for controlling actuators; picking and placing platens into devices; actuating pin plates; controlling tow tension, and so on, as needed for a given implementation.

Accordingly, FIG. 8 illustrates a computer system suitable 1100 for controlling a system for forming shaped plies according to an embodiment of the invention. The computer system 1100 includes one or more general purpose or specialized processors 1105, which can include microprocessors, microcontrollers, system on a chip (SoC) devices, digital signal processors, graphics processing units (GPUs), ASICs, and other information processing devices. The computer system 1100 also includes random access memory 1110 and non-volatile memory 1115, such as a magnetic or optical disk drive and/or flash memory devices.

The computer system 1100 may optionally include one or more visual display devices 1120. The computer system 1100 may also optionally include an audio processor 1125 for generating and receiving sound via speakers, microphone, or other audio inputs and outputs 1130; and optional sensors and input devices 1140, such as keyboards; scroll wheels; buttons; keypads; touch pads, touch screens, and other touch sensors; joysticks and direction pads; motion sensors, such as accelerometers and gyroscopes; global positioning system (GPS) and other location determining sensors; temperature sensors; mechanical, optical, magnetic and/or other types of position detectors and/or limit switches for detecting the current positions of the various components of the above-described systems; voltage, current, resistance, capacitance, inductance, continuity, or any other type of sensor for measuring electrical characteristics of the various components of the above-described systems; force, acceleration, stress or strain, and/or tension sensors; and/or any other type of input device known in the art. Computer system 1100 may optionally include one or more cameras or other optical measurement devices 1135 for capturing still images and/or video.

The computer system 1100 may also include one or more modems and/or wired or wireless network interfaces 1145 (such as the 802.11 family of network standards) for communicating data via local-area networks 1150; wide-area networks such as the Internet; CDMA, GSM, or other cellular data networks of any generation or protocol; industrial networks; or any other standard or proprietary networks. The computer system 1100 can also include a peripheral and/or data transfer interface, such as wired or wireless USB, IEEE 1394 (Firewire), Bluetooth, or other wired or wireless data transfer interfaces.

The computer system 1100 can include a power system 1155 for obtaining electrical power from an external source, such as AC line current or DC power tailored to the computer system 1100 via an external power supply, as well as one or more rechargeable or one-time use batteries, fuel cells, or any other electrical energy generation device.

Additionally, a power system 1155 may provide energy in the form of compressed gas, vacuum, and/or hydraulic systems to power various actuators and components of embodiments of the invention.

Computer system 1100 may be implemented in a variety of different form factors, including desktop and laptop configurations as well as embedded and headless forms.

Embodiments of the invention may use a variety of motors and actuators, such as brushed or brushless DC motors, AC synchronous and induction motors, stepper motors, servomotors, solenoids, and/or pneumatic and hydraulic actuators. In an embodiment, the computer system 1100 includes motor and actuator controls 1060 for providing power and control signals to these motors and actuators.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

Accordingly, although the description has been described with respect to particular embodiments thereof, these particular embodiments are merely illustrative, and not restrictive. For example, although fiber has been described in some embodiments as placed in an initial state "along an axis" other types of initial placement of one or more fiber strands may be employed, such as multiple fiber strands, one or more fibers not along a common axis, etc. Also, it may be desirable in some embodiments to use different tensioning approaches and even to employ "negative" tensioning or active feeding of the fiber or tow. Other variations from the embodiments described herein are possible.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A system for fabricating shaped plies for composite structures, the system comprising:
   a first support set positioned on an opposite side of a fiber axis from a second support set, wherein each of the first and second support sets includes one or more supports, and wherein each of the one or more supports includes a fiber-engaging surface;
   a fiber supply apparatus configured to draw a fiber under tension along the fiber axis between the first and second support sets;
   a motion mechanism adapted to move the one or more supports of at least one of the first and second support sets, across the fiber axis to engage with the fiber, and to edge-defining positions corresponding to a desired ply shape, thereby forming a fiber web;
   a fiber web fixing mechanism configured to fix the fiber web to form a shaped ply characterized by the desired ply shape; and
   a fiber web release mechanism adapted to remove the shaped ply from the fiber engaging surfaces of the first and second support sets.

2. The system of claim 1, wherein the first and second support sets include one or more moveable pins.

3. The system of claim 1, wherein the motion mechanism includes:
   a mechanical template defining edge positions of one or more supports of the first and second support sets.

4. The system of claim 3, further including:
   a template-changing system for installing any one of a plurality of mechanical templates in the system for use with the motion mechanism.

5. The system of claim 1, wherein the web fixing mechanism includes a platen adapted to compress and bond the fiber web.

6. The system of claim 5, wherein the platen is adapted to heat a heat-activated binder to bond the fiber web.

7. The system of claim 6, wherein the heat-activated binder is applied to the surface of the fiber web.

8. The system of claim 5, wherein the platen includes opposing non-planar surfaces facing the fiber web.

9. The system of claim 1, wherein the fiber web release mechanism includes at least one blade for severing the shaped ply from the first and second support sets after the fiber web is fixed by the fiber web fixing mechanism.

10. The method of claim 1, wherein the desired ply shape includes plural sub-shapes.

11. The method of claim 1, wherein the motion mechanism is adapted to move the first and second support sets simultaneously.

12. The method of claim 1, wherein the motion mechanism is adapted to move each of the supports of the first and second support sets sequentially.

13. A system for creating a ply representing a layer of fibers arranged in a predetermined shape, the system comprising:
    first means for defining a shape of a ply to be created;
    second means for employing pins to selectively pull a fiber tow in opposite directions into the shape, including by moving the pins into positions defined by an outline of the shape as determined by the first means; and
    third means for binding adjacent paths of the fiber tow that extend across or over the shape, thereby resulting in a first ply of the predetermined shape.

14. The system of claim 13, further including fourth means for releasing the ply from contact with the pins.

15. The system of claim 14, wherein the fourth means further includes means for cutting the fiber tow loose from each pin using a blade.

16. The system of claim 15, wherein the blade includes a separate blade coupled to each pin.

17. The system of claim 15, wherein the blade includes a flexible blade arranged to conform to a path as defined by the positions of the pins defined by an outline of the shape.

18. The system of claim 13, wherein the first means includes a template for defining the shape.

19. The system of claim 18, wherein the template includes a heatable platen, usable to thermally activate binder material, so as to implement the third means.

20. The system of claim 18, wherein the shape includes a non-planar shape and the template includes a platen including at least one non-planar surface matching at least a portion of the non-planar shape.

21. The system of claim 18, wherein the template includes:
   edges that restrain or otherwise fix positions of the pins on opposite sides of the template.

22. The system of claim 18, further including:
   a means for selectively rotating the template, from a first orientation to a second orientation, to facilitate creating a second ply of the predetermined shape, wherein fibers of the tow of the second ply are angled differently from fibers of the tow of the first ply depending upon the angle by which the template has been rotated between the first orientation and the second orientation.

23. The system of claim 18, wherein:
   the shape includes plural sub-shapes; and
   wherein the template defines terminal positions of the pins exhibiting the plural shapes.

24. The system of claim 13, wherein the fiber tow includes pre-impregnated fiber tow, which has been pre-treated with a binder material that can be activated by the third means.

25. The system of claim 13, wherein the third means include a dispenser of the binder material adapted to apply binder material to at least one surface of the fibers after the fiber tow has been pulled into the shape.

26. The system of claim 13, wherein the second means includes:
   means for pulling a fiber tow along a fiber axis between first and second subsets of the pins and pulling the first and second subsets of the pins across the fiber axis into the positions defined by the outline of the shape determined by the first means.

* * * * *